US011907357B2

(12) United States Patent
Kumar Agrawal

(10) Patent No.: US 11,907,357 B2
(45) Date of Patent: Feb. 20, 2024

(54) ELECTRONIC DEVICES AND CORRESPONDING METHODS FOR AUTOMATICALLY PERFORMING LOGIN OPERATIONS IN MULTI-PERSON CONTENT PRESENTATION ENVIRONMENTS

(71) Applicant: Motorola Mobility LLC, Chicago, IL (US)

(72) Inventor: Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 408 days.

(21) Appl. No.: 17/379,884

(22) Filed: Jul. 19, 2021

(65) Prior Publication Data

US 2023/0019529 A1 Jan. 19, 2023

(51) Int. Cl.
*G06F 21/45* (2013.01)
*G02B 27/01* (2006.01)
*G06F 3/147* (2006.01)
*G06F 3/14* (2006.01)
*G06F 21/31* (2013.01)

(52) U.S. Cl.
CPC ......... *G06F 21/45* (2013.01); *G02B 27/0172* (2013.01); *G06F 3/147* (2013.01); *G06F 3/1423* (2013.01); *G06F 21/31* (2013.01); *G02B 2027/0141* (2013.01); *G02B 2027/0178* (2013.01)

(58) Field of Classification Search
CPC ........ G06F 21/31; G06F 21/45; G06F 3/1423; G06F 3/147; G02B 2027/0141; G02B 2027/0178; G02B 27/0172
See application file for complete search history.

(56) References Cited

U.S. PATENT DOCUMENTS

| 10,387,847 | B2 * | 8/2019 | Pinard | G06Q 10/1095 |
| 10,810,660 | B1 * | 10/2020 | Diggdon | G06Q 20/00 |
| 10,916,101 | B2 * | 2/2021 | Wellisch | G07F 17/3276 |
| 10,956,122 | B1 | 3/2021 | Agrawal et al. | |
| 11,062,098 | B1 * | 7/2021 | Bergeron | H04L 9/3242 |
| 11,463,499 | B1 * | 10/2022 | Fieldman | H04L 65/403 |
| 11,521,189 | B1 * | 12/2022 | Gordon | G06Q 20/40145 |
| 11,521,262 | B2 * | 12/2022 | Rule | G07G 1/0081 |
| 11,589,124 | B1 * | 2/2023 | Gordon | H04N 21/816 |
| 2016/0269508 | A1 * | 9/2016 | Sharma | H04L 63/0884 |
| 2018/0109510 | A1 * | 4/2018 | Tommy | H04L 63/083 |

(Continued)

*Primary Examiner* — Gary S Gracia

(74) *Attorney, Agent, or Firm* — Philip H. Burrus, IV

(57) ABSTRACT

An electronic device includes a communication device electronically communicating with a content presentation companion device operating as a primary display for the electronic device and an augmented reality companion device. One or more sensors detect multiple persons within an environment of the electronic device while the content presentation companion device operates as the primary display for the electronic device. One or more processors automatically log a person operating the augmented reality companion device into the electronic device upon identifying the person operating the augmented reality companion device as being associated an authorized account profile selected from of a plurality of account profiles operable on the electronic device.

20 Claims, 8 Drawing Sheets

(56) References Cited

U.S. PATENT DOCUMENTS

| | | | |
|---|---|---|---|
| 2018/0165506 A1* | 6/2018 | George | G06F 3/011 |
| 2019/0163432 A1* | 5/2019 | Files | G06F 3/147 |
| 2020/0112759 A1* | 4/2020 | Alameh | H04N 21/42202 |
| 2020/0201038 A1* | 6/2020 | Gelman | G03H 1/2294 |
| 2021/0166804 A1* | 6/2021 | Metruck | G16H 20/70 |
| 2022/0070167 A1* | 3/2022 | Adams, Jr. | G06F 21/30 |
| 2022/0353099 A1* | 11/2022 | Howland | H04L 12/1818 |
| 2022/0383696 A1* | 12/2022 | Palmisano | G07F 17/3234 |
| 2023/0019529 A1* | 1/2023 | Kumar Agrawal | G06F 21/45 |

* cited by examiner

ELECTRONIC DEVICES AND CORRESPONDING METHODS FOR AUTOMATICALLY PERFORMING LOGIN OPERATIONS IN MULTI-PERSON CONTENT PRESENTATION ENVIRONMENTS

BACKGROUND

Technical Field

This disclosure relates generally to electronic devices, and more particularly to electronic devices operable with companion electronic devices.

Background Art

The technology associated with portable electronic devices, such as smartphones and tablet computers, is continually improving. Illustrating by example, while not too long ago such devices included only grey scale liquid crystal diode displays with large, blocky pixels, modern smartphones, tablet computers, and even smart watches include organic light emitting diode (OLED) displays with incredibly small pixels.

While these OLED displays offer extremely high contrast ratios capable of presenting high dynamic range images and videos, their size remains limited so that these devices can be easily carried in a hand, pocket, or backpack. To enable content received by these devices to be more easily seen, such as when a group wants to watch the content for example, many portable electronic devices include a content redirection feature. Using the content redirection feature, a person may stream a movie through a smartphone, but then redirect the movie to a larger display situated near the smartphone so that a family or other group can watch the movie on the larger display. While great for watching the movie, the redirection feature can require multiple steps before movie watching or other activities can begin, including performing login and application selection operations. The necessity of performing these additional steps can be exacerbated when a smartphone or other electronic device includes multiple user accounts. It would be advantageous to have an improved electronic device with user interface features providing simpler and more efficient device access operations.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
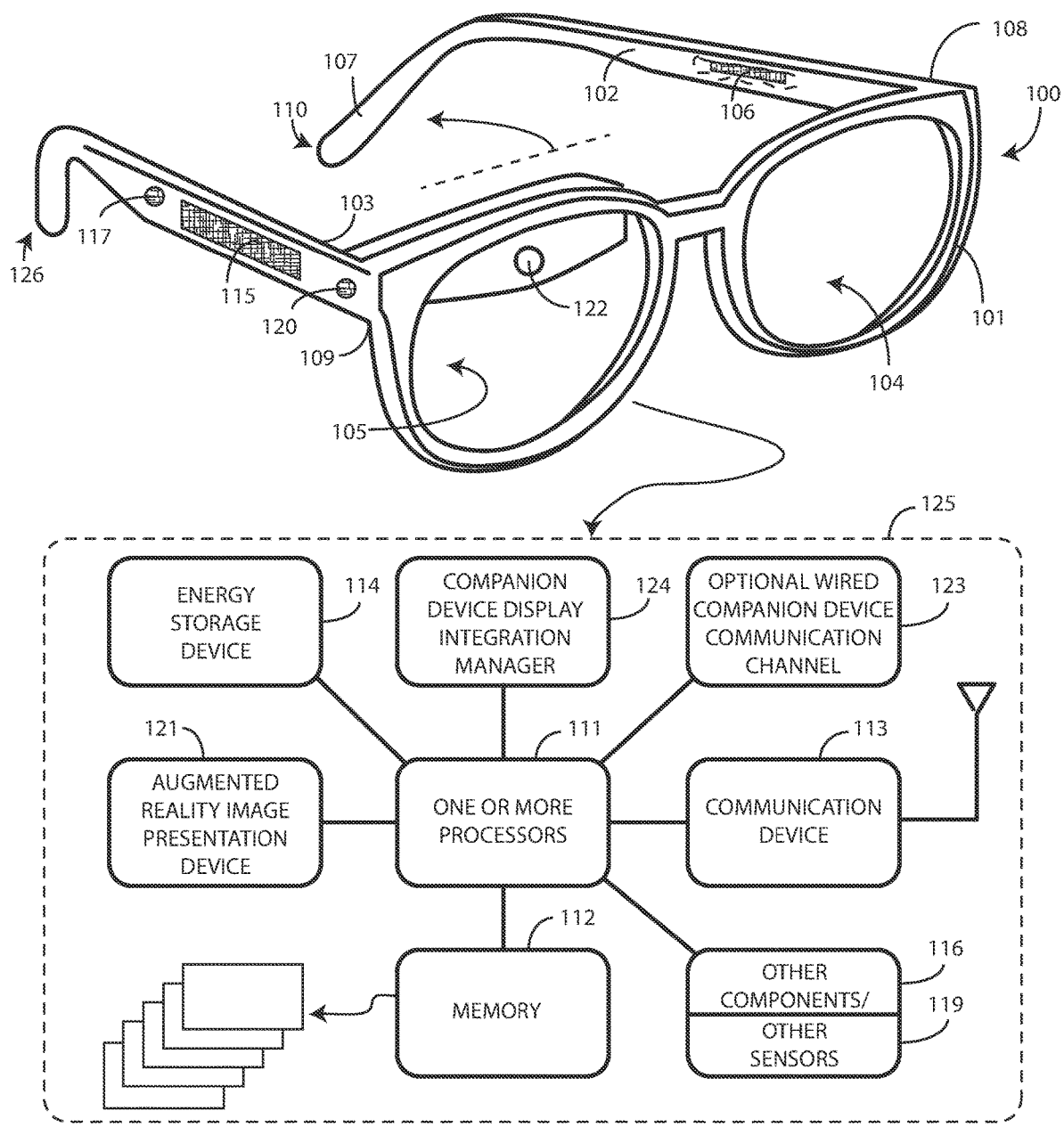
FIG. 1 illustrates one explanatory augmented reality companion device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to automatically selecting a login credential for an electronic device associated with a person operating an augmented reality companion device and automatically logging into an account profile of the electronic device using the login credential. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of automatically selecting a login credential or an application profile login credential in response to identifying a person operating an augmented reality companion device that is in communication with an electronic device, and then logging into the electronic device using the login credential or an application operating on the electronic device using the application profile login credential as described below. The non-processor circuits may include, but are not limited to, a radio receiver, a radio transmitter, signal drivers, clock circuits, power source circuits, and user input devices. As such, these functions may be interpreted as steps of a method to perform the redirection of event notifications and/or transmission of subtitles to the augmented reality companion device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an augmented reality companion device, which is configured as a pair of augmented reality glasses in an explanatory embodiment, which can be operable with an electronic device that is presenting content on a content presentation companion device that is acting as a primary display for the electronic device. Embodiments of the disclosure contemplate that modern electronic devices, such as smartphones, tablet computers, and laptop computers, support multiple user accounts with each user creating a different login credential with which to login and/or authenticate themselves to the electronic device. Illustrating by example, a family tablet computer may include a user account for the father, the mother, and a child. Each of the father, mother, and child can create a user account and associated login credential with which they can access the electronic device. Each user account may have associated therewith a user profile as well. The father's user account may have associated therewith cooking and gardening applications, while the mother's user account has associated therewith sporting and travel applications. The child's user account may include applications for learning and entertainment. By using their unique login credential, the father, mother, and child can each login to their user account to see their own user profile exclusively without the clutter or distraction of others user profiles, and so forth.

Additionally, applications operable within one or more user profiles can support multiple users who each have an application profile login credential. When, for example, launching a video streaming application within a user account, the application may have associated therewith a plurality of application profiles associated with a plurality of users. By entering an application profile login credential, a particular user can access a specific user profile associated with the application. Thus, a father may be able to maintain a wish list of gardening documentaries within his user profile, while a wife, using the same application, may be able to record and save Olympic trials. A child may be able to use the same application, but with a different application profile login credential, to access cartoons and educational programming.

Embodiments of the disclosure contemplate that these different account profiles that are available on a single electronic device, or these different application user profiles available within a single application, provide an environment for automatically filtering electronic device and application specific content that is associated with a particular user entering their login credential or application profile login credential. Additionally, these user profiles or application specific user profiles can be used as filtering devices as well. Illustrating by example, when the child logs into an application using their unique application profile login credential, filtering associated with that application profile may ensure that content available makes sense for the child, thereby avoiding exposure of the child to inappropriate content. Such filtering can be used for privacy purposes as well.

In one or more embodiments, one or more processors of an electronic device detect that a communication device of the electronic device is in communication with both a content presentation companion device operating as a primary display for the electronic device and at least one augmented reality companion device, one example of which are augmented reality glasses. One or more sensors then detect multiple persons being present within an environment of the electronic device while the content presentation companion device is operating as the primary display for the electronic device. When this occurs, the one or more processors select a login credential for the electronic device associated with the person operating the augmented reality companion device and automatically log into an account profile of the electronic device associated with the person operating eth augmented reality companion device using the login credential.

The process can also occur when applications are actuated. For instance, in one or more embodiments the one or more processors detect the actuation of an application operating on the electronic device. When this occurs, the one or more processors can determine that the application has associated therewith a plurality of application profiles associated with a plurality of application users. The one or more processors can select an application profile login credential associated with a person operating an augmented reality companion device and can then automatically log in to an application profile of the application associated with the person operating the augmented reality companion device using the application profile login credential.

When the persons switch who is wearing the glasses, the one or more processors of the electronic device can automatically detect this to change user profiles at the electronic device and/or user application profiles within an application. For example, if a father is initially operating the augmented reality companion device with the one or more processors of the electronic device having logged in the father to the electronic device and having logged in the father to his application profile in a video streaming application, these logins can change if the father hands the augmented reality companion device to the mother who then dons them. In one or more embodiments, one or more sensors of the electronic device can detect this transfer of operation of the augmented reality companion device from the father to the mother and can identify the mother as being another person of the plurality of persons within the environment who is operating the augmented reality companion device. The one or more processors of the electronic device can then select another login credential for the electronic device associated with the mother after the transfer of operation and can automatically log the mother into her account profile using this other login credential. When the mother then launches a music streaming application, the one or more processors can select another application profile login credential associated with the mother to log the mother into the music streaming application using the other application profile login credential to present the mother's playlists automatically.

Advantageously, embodiments of the disclosure presume that the primary use case is driven by the user that is currently wearing augmented reality glasses and adapt the content presentations accordingly. One such use case includes managing multi-user electronic device or application profile logins in multi-person content presentation environments. Embodiments of the disclosure accordingly enhance the user experience by leveraging the usage of augmented reality glasses in the presentation environment.

In one or more embodiments, one or more processors of an electronic device determine that the electronic device is connected to an external display, television, or other device and is operating in a content presentation or desktop mode. The one or more processors further determine that the electronic device is operating with an augmented reality companion device, one example of which that will be used for illustrative purposes being augmented reality glasses.

In one or more embodiments, the one or more processors determine that the content being presented on the content presentation companion device is being consumed by more than one user in addition to the owner of the electronic device. This can be accomplished, for example, using image analysis performed on images captured by an imager. Other techniques will be obvious to those of ordinary skill in the art having the benefit of this disclosure.

In one or more embodiments, the one or more processors determine that the electronic device supports multiple user logins with at least two users currently being present and viewing the content. The one or more processors, using one or more sensors of the electronic device, also determine that the augmented reality companion device is being operated by a user having login credentials to the electronic device and/or application profile login credentials to applications operating on the electronic device. For the latter, the one or more processors can determine when a particular application is being opened, launched, or actuated, that it is configured with multiple application user login accounts.

In one or more embodiments, the one or more processors of the electronic device automatically select a login credential or application profile login credential belonging to a person who is actively operating the augmented reality companion device. Where the augmented reality companion device is configured as augmented reality glasses, the one or more processors can automatically select a login credential or application profile login credential for the person who is wearing the augmented reality glasses.

In one or more embodiment, at any time during consumption of the content, the one or more processors may determine whether operation of the augmented reality companion device is being transferred from one person to another. Depending upon the context of the device home screen or application, the one or more processors can provide an option for the electronic device or application to automatically switch from the profile of the person previously operating the augmented reality companion device to the profile of the person currently operating the augmented reality companion device.

In one or more embodiments, the identity of an operator of an augmented reality companion device can be used for filtering operations as well. Illustrating by example, in one or more embodiments the one or more processors of an electronic device can determine that the person operating an augmented reality companion device is a minor. When this occurs, the one or more processors can filter at least some content available from the electronic device to preclude presentation of the filtered content at the content presentation companion device. The one or more processors can determine that the person operating the augmented reality companion device is a minor in a variety of ways. For instance, the one or more processors can perform image analysis on images captured by an imager of the electronic device. In other embodiments, the one or more processors can determine that the person operating the augmented reality companion device is a minor by determining a size of the augmented reality companion device. If the size of the augmented reality companion device is below a predetermined size threshold, the one or more processors can presume that the person is a minor based upon their size. As with identification of the person, identification of the size of the augmented reality companion device can be performed via image analysis in some embodiments. In other embodiments, the electronic device can interrogate the augmented reality companion device using electronic communication signals to determine the size of the augmented reality companion device and whether that size is below the predetermined size threshold. Other techniques for determining the size of the augmented reality companion device will be obvious to those of ordinary skill in the art having the benefit of this disclosure.

In one or more embodiments, an electronic device includes a communication device that is electronically communicating with a content presentation companion device operating as a primary display for the electronic device. The communication device also communicates with an augmented reality companion device, one example of which is augmented reality glasses.

One or more sensors of the electronic device detect multiple persons being within an environment of the electronic device while the content presentation companion device operates as the primary display for the electronic device. One or more processors of the electronic device can automatically log a person operating the augmented reality companion device into the electronic device upon identifying the person operating the augmented reality companion device as being associated with an authorized account profile selected from a plurality of account profiles operable on the electronic device. In one or more embodiments, the one or more processors automatically log the person operating the augmented reality companion device into the electronic device by selecting a login credential for the electronic device associated with the person operating the augmented reality companion device.

In one or more embodiments, the one or more processors can also automatically log the person operating the augmented reality companion device into an application operating on the electronic device in response to detecting actuation of the application. When operation of the augmented reality companion device transfers from one person to another, the one or more processors can optionally prompt for permission to transition from the authorized account profile to another authorized account profile in response to the one or more sensors of the electronic device detecting the transfer of operation of the augmented reality companion device from the first person to the second person. Thereafter, the one or more processors can transition from the authorized account profile to another authorized account profile in response to the one or more sensors detecting the transfer of operation of the augmented reality companion device from the first person to the second person.

The one or more processors can additionally filter content that can be presented on the content presentation companion device serving as the primary display for the electronic device using the augmented reality companion device as well. Illustrating by example, in one or more embodiments the one or more processors filter at least some content available from the electronic device by precluding presentation of some of the content on the content presentation companion device when the one or more processors determine that a size of the augmented reality companion device is less than a predefined augmented reality companion device size threshold.

Turning now to FIG. 1, illustrated therein is one explanatory augmented reality companion device 100 configured in accordance with one or more embodiments of the disclosure. In the illustrative embodiment of FIG. 1, the augmented reality companion device 100 comprises augmented reality glasses. However, this is for explanatory purposes only, as the augmented reality companion device 100 could be configured in any number of other ways as well. Illustrating by example, the augmented reality companion device 100 could also be configured as any of sunglasses, goggles, masks, shields, or visors. Other forms of the augmented reality companion device 100 will be obvious to those of ordinary skill in the art having the benefit of this disclosure.

The augmented reality companion device 100 of FIG. 1 includes a frame 101 and one or more stems 102, 103. Here, the one or more stems 102, 103 comprise a first stem 102 and a second stem 103. One or more lenses 104, 105 can be disposed within the frame 101. The lenses 104, 105 can be prescription or non-prescription, and can be clear, tinted, or dark. In one or more embodiments the stems 102, 103 are pivotable from a first position where they are situated adjacent to, and parallel with, the frame 101, to a second, radially displaced open position shown in FIG. 1. However, in other embodiments the stems 102, 103 may be fixed relative to the frame 101. In still other embodiments, such as might be the case if the augmented reality companion device 100 were configured as goggles, the stems 102, 103 may be flexible or soft. For example, the stems of goggles are frequently elasticized fabric, which is soft, flexible, pliable, and stretchy. Other types of stems 102, 103 will be obvious to those of ordinary skill in the art having the benefit of this disclosure.

In one or more embodiments the stems 102, 103 attach to the frame 101 at a first end 108, 109 and extend distally from the frame 101 to a second, distal end 110, 126. In one embodiment, each stem 102, 103 includes a temple portion 106 and an ear engagement portion 107. The temple portion 106 is the portion of the stem 102, 103 passing from the frame 101 past the temple of a wearer, while the ear engagement portion 107 engages the wearer's ear to retain the augmented reality glasses to the wearer's head.

Since the augmented reality companion device 100 is configured as an electronic device, one or both of the frame 101 and the stems 102, 103 can comprise one or more electrical components. These electrical components are shown illustratively in a schematic block diagram 125 in FIG. 1. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors 111. The one or more processors 111 can be disposed in one or both of the stems 102, 103 or the frame 101. The one or more processors 111 can be operable with a memory 112. The one or more processors 111, which may be any of one or more microprocessors, programmable logic, application specific integrated circuit device, or other similar device, are capable of executing program instructions and methods described herein. The program instructions and methods may be stored either on-board in the one or more processors 111, or in the memory 112, or in other computer readable media coupled to the one or more processors 111.

The one or more processors 111 can be configured to operate the various functions of the augmented reality companion device 100, and also to execute software or firmware applications and modules that can be stored in a computer readable medium, such as memory 112. The one or more processors 111 execute this software or firmware, in part, to provide device functionality. The memory 112 may include either or both static and dynamic memory components, may be used for storing both embedded code and user data.

In one or more embodiments, the augmented reality companion device 100 also includes an optional wireless communication device 113. Where included, the wireless communication device 113 is operable with the one or more processors 111 and is used to facilitate electronic communication with one or more electronic devices or servers or other communication devices across a network. Note that it is possible to combine the one or more processors 111, the memory 112, and the wireless communication device 113 into a single device, or alternatively into devices having fewer parts while retaining the functionality of the constituent parts.

The wireless communication device 113, which may be one of a receiver or transmitter and may alternatively be a transceiver, operates in conjunction with the one or more processors 111 to electronically communicate through a communication network. For example, in one embodiment, the wireless communication device 113 can be configured to communicate through a traditional cellular network. Other examples of networks with which the communication circuit may communicate include proprietary networks and direct communication networks. In other embodiments, the wireless communication device 113 can communicate with near field or local area networks, infrared communication circuits, magnetic field modulation circuits, and Wi-Fi circuits. In one or more embodiments, the wireless communication device 113 can be configured to provide messaging functionality to deliver electronic messages to remote devices.

A battery 114 or other energy storage device can be included to provide power for the various components of the augmented reality companion device 100. While a battery 114 is shown in FIG. 1, it will be obvious to those of ordinary skill in the art having the benefit of this disclosure that other energy storage devices can be used instead of the battery 114, including a micro fuel cell or an electrochemical capacitor. The battery 114 can include a lithium-ion cell, lithium polymer cell, or a nickel metal hydride cell, such cells having sufficient energy capacity, wide operating temperature range, large number of charging cycles, and long useful life. The battery 114 may also include overvoltage and overcurrent protection and charging circuitry. In one embodiment, the battery 114 comprises a small, lithium polymer cell.

In one or more embodiments, a photovoltaic device 115, such as a solar cell, can be included to recharge the battery 114. In one embodiment, the photovoltaic device 115 can be disposed along the temple portion 106 of the stems 102, 103. In this illustrative embodiment, two solar cells are disposed in the temple portion 106 of each stem 102, 103, respectively.

Other components 116 can be optionally included in the augmented reality companion device 100 as well. For example, in one embodiment one or more microphones can be included as audio capture devices 117. These audio capture devices can be operable with the one or more processors 111 to receive voice input. Additionally, in one or more embodiments the audio capture devices 117 can capture ambient audio noise. Signals corresponding to captured audio can be transmitted to an electronic device in communication with the augmented reality companion device 100 or a server or cloud-computing device. The other component 116 can additionally include loudspeakers for delivering audio content to a user wearing the augmented reality companion device 100.

The other components 116 can also include a motion generation device for providing haptic notifications or vibration notifications to a user. For example, a piezoelectric transducer, rotational motor, or other electromechanical device can be configured to impart a force or vibration upon the temple portion 106 of the stems 102, 103, or alternatively along the frame 101. The motion generation device can provide a thump, bump, vibration, or other physical sensation to the user. The one or more processors 111 can be configured to actuate the motion generation device to deliver a tactile or vibration output alone or in combination with other outputs such as audible outputs.

Similarly, in one or more embodiments the augmented reality companion device 100 can include a video capture device 122 such as an imager. The imager can be disposed within the frame 101 or stems 102, 103. In one or more embodiments, the video capture device 122 can function as a to detect changes in optical intensity, color, light, or shadow in the near vicinity of the augmented reality companion device 100. As with the audio capture device 117, captured video information can be transmitted to an electronic device, a remote server, or cloud-computing device.

Other sensors 119 can be optionally included in the augmented reality companion device 100. One example of such a sensor is a global positioning system device for determining where the augmented reality companion device 100 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

The other sensors 119 can also include an optional user interface. The user interface can be used, for example, to activate the circuit components or turn them OFF, control sensitivity of the other sensors 119, and so forth. The user interface, where included, can be operable with the one or more processors 111 to deliver information to, and receive information from, a user. The user interface can include a rocker switch, slider pad, button, touch-sensitive surface, or other controls, and optionally a voice command interface. These various components can be integrated together.

In one or more embodiments, an audio output device 120, such as a loudspeaker or other transducer, can deliver audio output to a user. For example, piezoelectric transducers can be operably disposed within the stems 102, 103. Actuation of the piezoelectric transducers can cause the stems 102, 103 to vibrate, thereby emitting acoustic output. More traditional audio output devices 120, such as loudspeakers, can be used as well.

The other components 116 can optionally include a haptic device providing haptic feedback to a user. The haptic device can include a motion generation device to deliver a tactile response to the user. For example, a piezoelectric transducer or other electromechanical device can be included in the stems 102, 103. The transducer can actuate to impart a force upon the user's head to provide a thump, bump, vibration, or other physical sensation to the user. The inclusion of both the audio output device 120 and the haptic device allows both audible and tactile feedback to be delivered.

In one or more embodiments, the augmented reality companion device 100 includes an augmented reality image presentation device 121 operable to deliver augmented reality imagery to a user. The augmented reality image presentation device 121 can be operable with a projector 122. In the illustrative embodiment of FIG. 1, the frame 101 supports the projector 122. In one or more embodiments the projector 122 is configured to deliver images to a holographic optical element when the augmented reality companion device 100 is operating in an augmented reality mode of operation.

In one embodiment, the projector 122 is a modulated light projector operable to project modulated light images along a surface or holographic optical element. In another embodiment, the projector 122 is a thin micro projector. In another embodiment, the projector 122 can comprise a laser projector display module. Other types of projectors will be obvious to those of ordinary skill in the art having the benefit of this disclosure.

In one or more embodiments, the projector 122 can include a lens and a spatial light modulator configured to manipulate light to produce images. The projector 122 can include a light source, such as a single white light emitting diode, multiple separate color light emitting diodes, or multiple separate color laser diodes that deliver visible light to the spatial light modulator through a color combiner. The augmented reality image presentation device 121 can drive the spatial light modulator to modulate the light to produce images. The spatial light modulator can be optically coupled (e.g., by free space propagation) to the lens and/or a beam steerer. Where used, a beam steerer serves to steer a spatially modulated light beam emanating from the spatial light modulator through the lens to create images.

In one or more embodiments, the augmented reality companion device 100 includes a companion device display integration manager 124. The companion device display integration manager 124 can be used to communicate with a companion electronic device. Illustrating by example, in one or more embodiments the augmented reality companion device 100 comes in different sizes. When another electronic device wishes to determine whether the size of the augmented reality companion device 100 is below a predefined size threshold, the other electronic device may interrogate the augmented reality companion device 100 using the communication device 113. The companion device display integration manager 124 may provide size, user profile, or other information associated with the augmented reality companion device 100 to the other electronic device 200 using the communication device 113 in response. Additionally, when another device transmits event notifications, subtitles, or other contextual information to the augmented reality companion device 100, the companion device display integration manager 124 can deliver that information to the augmented reality image presentation device 121 for presentation to the user as an augmented reality experience via the projector 122.

Figure 2:
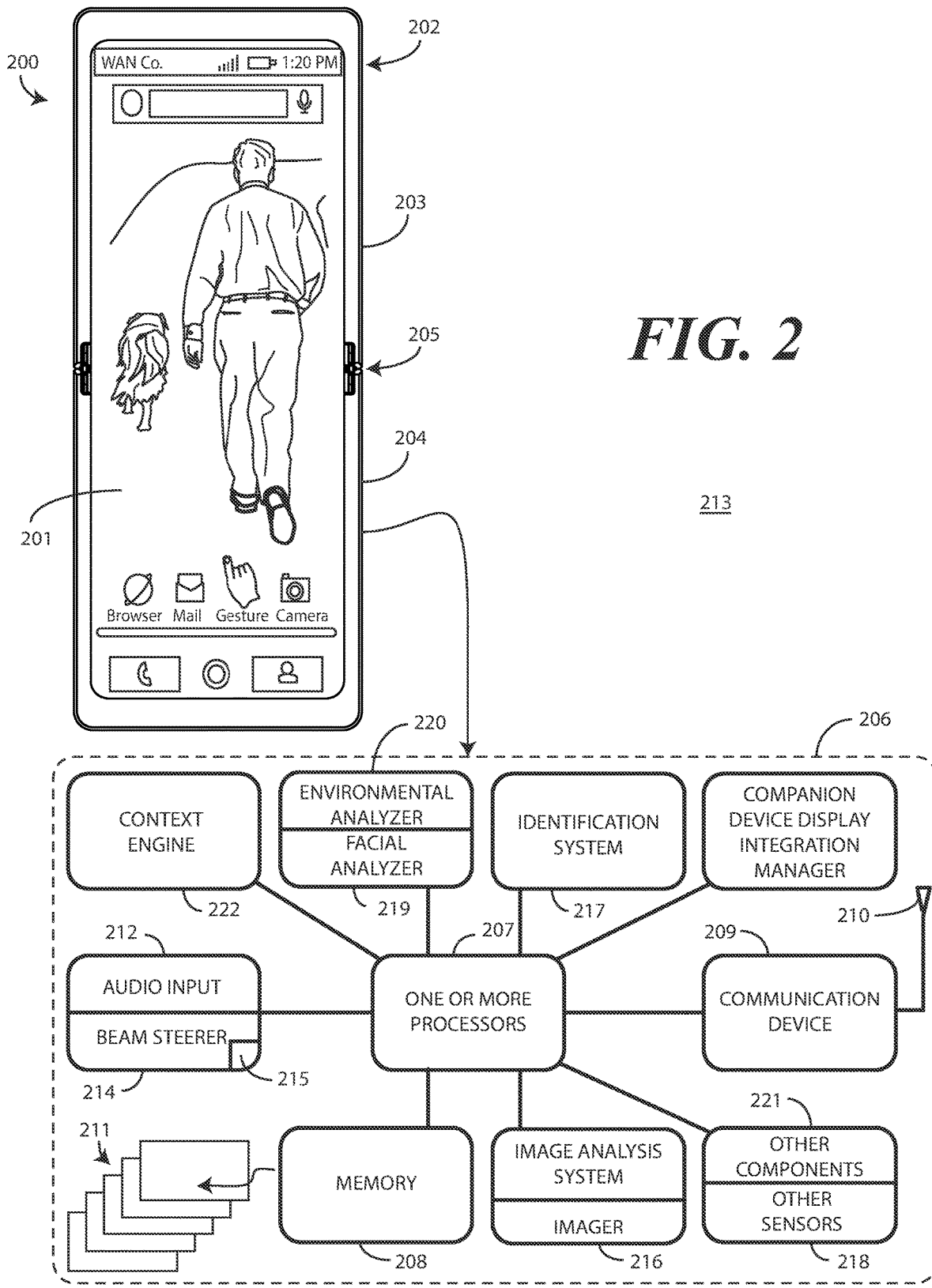
FIG. 2 illustrates one explanatory electronic device in accordance with one or more embodiments of the disclosure.

The augmented reality companion device 100 of FIG. 1 can operate as a stand-alone electronic device in one or more embodiments. However, in other embodiments, the augmented reality companion device 100 can operate in tandem with an electronic device, via wireless electronic communication using the wireless communication device 113 or via a wired connection channel 123 to form an augmented reality system. Turning now to FIG. 2, illustrated therein is one such electronic device 200.

The electronic device 200 of FIG. 2 is a portable electronic device and is shown as a smartphone for illustrative purposes. However, it should be obvious to those of ordinary skill in the art having the benefit of this disclosure that other electronic devices may be substituted for the explanatory smart phone of FIG. 2. For example, the electronic device 200 could equally be a conventional desktop computer, palm-top computer, a tablet computer, a gaming device, a media player, or other device.

This illustrative electronic device 200 includes a display 201, which may optionally be touch-sensitive. Users can deliver user input to the display 201, which serves as a user interface for the electronic device 200. In one embodiment, users can deliver user input to the display 201 of such an embodiment by delivering touch input from a finger, stylus, or other objects disposed proximately with the display 201. In one embodiment, the display 201 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position. In other embodiments, the device housing 202 will be rigid and will include no hinge. In still other embodiments, the device housing 202 will be manufactured from a flexible material such that it can be bent and deformed. Where the device housing 202 is manufactured from a flexible material or where the device housing 202 includes a hinge, the display 201 can be manufactured on a flexible substrate such that it bends. In one or more embodiments, the display 201 is configured as a flexible display that is coupled to the first device housing 203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 200. In one or more embodiments, the block diagram schematic 206 is configured as a printed circuit board assembly disposed within the device housing 202 of the electronic device 200. Various components can be electrically coupled together by conductors or a bus disposed along one or more printed circuit boards.

The illustrative block diagram schematic 206 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

In one embodiment, the electronic device includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation.

In this illustrative embodiment, the block diagram schematic 206 also includes a communication device 209 that can be configured for wired or wireless communication with one or more other devices or networks. The networks can include a wide area network, a local area network, and/or personal area network. The communication device 209 may also utilize wireless technology for communication, such as, but are not limited to, peer-to-peer or ad hoc communications such as HomeRF, Bluetooth and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth.

In one or more embodiments, the block diagram schematic 206 includes an audio input/processor 212. The audio input/processor 212 is operable to receive audio input from an environment 213 about the electronic device 200. The audio input/processor 212 can include hardware, executable code, and speech monitor executable code in one embodiment. The audio input/processor 212 can be operable with one or more predefined identification references stored in memory 208. With reference to audio input, the predefined identification references can comprise representations of basic speech models, representations of trained speech models, or other representations of predefined audio sequences that are used by the audio input/processor 212 to receive and identify voice commands that are received with audio input captured by an audio capture device. In one embodiment, the audio input/processor 212 can include a voice recognition engine. Regardless of the specific implementation utilized in the various embodiments, the audio input/processor 212 can access various speech models stored with the predefined identification references to identify speech commands, languages being spoken, and other information.

The audio input/processor 212 can include a beam steering engine 214 comprising one or more microphones 215. Input from the one or more microphones 215 can be processed in the beam steering engine 214 such that the one or more microphones define a virtual microphone. This virtual microphone can define an acoustic reception cone that can be virtually "steered" around the electronic device 200. Alternatively, actual steering can occur as well, such as switching between a left and right microphone or a front and back microphone or switching various microphones ON and OFF individually. In one or more embodiments, two or more microphones 215 can be included for selective beam steering by the beam steering engine 214.

Illustrating by example, a first microphone can be located on a first side of the electronic device 200 for receiving audio input from a first direction, while a second microphone can be placed on a second side of the electronic device 200 for receiving audio input from a second direction. These microphones can be "steered" by selectively turning them ON and OFF.

The beam steering engine 214 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager 216 can estimate a location of a person's face and deliver signals to the beam steering engine 214 alerting it in which direction to focus the acoustic reception cone and/or steer the first microphone and the second microphone, thereby adding confirmation to audio steering and saving time. Where multiple people are around the electronic device 200, this steering advantageously directs a beam reception cone toward a particular person so that languages spoken, language preferences, and other information about the person's speech can be ascertained.

Alternatively, the beam steering engine 214 processes and combines the signals from two or more microphones to perform beam steering. The one or more microphones 215 can be used for voice commands and/or for language recognition. In response to control of the one or more microphones 215 by the beam steering engine 214, a user location direction can be determined. The beam steering engine 214 can then select between the first microphone and the second microphone to beam steer audio reception toward the user. Alternatively, the audio input/processor 212 can employ a weighted combination of the microphones to beam steer audio reception toward the user.

In one embodiment, the audio input/processor 212 is configured to implement a voice control feature that allows a user to speak to cause the one or more processors 207 to identify a language preference corresponding to a particular person. For example, the user may say, "No me gusta." This statement, which is in Spanish, allows the one or more processors 207 to cooperate with an identification system 217 to identify both the language and who is the source of the statement within the environment 213 of the electronic device 200. Consequently, this statement can cause the one or more processors 207 to access the identification system 217 and begin an identification process to determine which person within the environment 213 has Spanish as their language preference. In one or more embodiments, the audio input/processor 212 listens for voice commands, processes the commands and, in conjunction with the one or more processors 207, determines language preferences of persons situated within the environment 213 of the electronic device 200.

The one or more processors 207 can perform filtering operations on audio input received by the audio input/processor 212. For example, in one embodiment the one or more processors 207 can filter the audio input into identifiable audio input, i.e., first audio input, and other audio input that is not identifiable, i.e., second audio input.

Various sensors 218 can be operable with the one or more processors 207. One example of a sensor that can be included with the various sensors 218 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 200 by establishing electric field lines between pairs of capacitive sensors and then detecting perturbations of those field lines.

Another example of a sensor that can be included with the various sensors 218 is a geo-locator that serves as a location detector. In one embodiment, location detector is able to determine location data when authenticating a user. Location can be determined by capturing the location data from a constellation of one or more earth orbiting satellites, or from a network of terrestrial base stations to determine an approximate location. The location detector may also be able to determine location by locating or triangulating terrestrial base stations of a traditional cellular network, or from other local area networks, such as Wi-Fi networks.

Another example of a sensor that can be included with the various sensors 218 is an orientation detector operable to determine an orientation and/or movement of the electronic device 200 in three-dimensional space. Illustrating by example, the orientation detector can include an accelerometer, gyroscopes, or other device to detect device orientation and/or motion of the electronic device 200. Using an accelerometer as an example, an accelerometer can be included to detect motion of the electronic device. Additionally, the accelerometer can be used to sense some of the gestures of the user, such as one talking with their hands, running, or walking.

The orientation detector can determine the spatial orientation of an electronic device 200 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 200.

The identification system 217 is operable with the one or more processors 207. A first identifier of the identification system 217 can include an imager 216. In one embodiment, the imager 216 comprises a two-dimensional imager configured to receive at least one image of a person within an environment of the electronic device 200. In one embodiment, the imager 216 comprises a two-dimensional RGB imager. In another embodiment, the imager 216 comprises an infrared imager. Other types of imagers suitable for use as the imager 216 of the identification system 217 will be obvious to those of ordinary skill in the art having the benefit of this disclosure.

The identification system 217 can be operable with a face analyzer 219 and an environmental analyzer 220. The face analyzer 219 and/or environmental analyzer 220 can be configured to process an image or depth scan of an object and determine whether the object matches predetermined criteria by comparing the image or depth scan to one or more predefined identification references stored in memory 208.

For example, the face analyzer 219 and/or environmental analyzer 220 can operate as an identification module configured with optical and/or spatial recognition to identify objects using image recognition, character recognition, visual recognition, facial recognition, color recognition, shape recognition, and the like. Advantageously, the face analyzer 219 and/or environmental analyzer 220, operating in tandem with the identification system 217, can be used as a facial recognition device to determine the identity of one or more persons detected within the environment 213 of the electronic device 200.

In one embodiment when the identification system 217 detects a person, the imager 216 can capture a photograph of that person. The identification system 217 can then compare the image to one or more predefined identification references stored in the memory 208. This comparison, in one or more embodiments, is used to confirm beyond a threshold authenticity probability that the person's face in the image sufficiently matches one or more of the predefined identification references stored in the memory 208 to identify the person and, in some situations, determine who is an authorized user of the electronic device 200 and/or who is the owner of the electronic device 200. Beneficially, this optical recognition performed by the identification system 217 operating in conjunction with the face analyzer 219 and/or environmental analyzer 220 the electronic device 200 to determine who is within the environment 213 of the electronic device 200, as well as who is using an augmented reality companion device (100).

In one or more embodiments, a user can "train" the electronic device 200 by storing predefined identification references in the memory 208 of the electronic device 200. Illustrating by example, a user may take a series of pictures. They can include identifiers of special features such as eye color, sink color, air color, weight, and height. They can include the user standing in front of a particular wall, which is identifiable by the environmental analyzer from images captured by the imager 216. They can include the user raising a hand, touching hair, or looking in one direction, such as in a profile view. These can then be stored as predefined identification references in the memory 208 of the electronic device 200.

The face analyzer 219 can include an image/gaze detection-processing engine as well. The image/gaze detection-processing engine can process information to detect a user's gaze point. Electronic signals can then be delivered from the imager 216 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 221 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 221 can also include proximity sensors. The proximity sensors fall in to one of two camps: active proximity sensors and "passive" proximity sensors. Either the proximity detector components or the proximity sensor components can be generally used for gesture control and other user interface protocols.

The other components 221 can optionally include a barometer operable to sense changes in air pressure due to elevation changes or differing pressures of the electronic device 200. The other components 221 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

A context engine 222 can then be operable with the various sensors to detect, infer, capture, and otherwise determine persons and actions that are occurring in an environment about the electronic device 200. For example, where included one embodiment of the context engine 222 determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine 222 in detecting multi-modal social cues, emotional states, moods, and other contextual information. The context engine 222 can comprise an artificial neural network or other similar technology in one or more embodiments.

In one or more embodiments, the context engine 222 is operable with the one or more processors 207. In some embodiments, the one or more processors 207 can control the context engine 222. In other embodiments, the context engine 222 can operate independently, delivering information gleaned from detecting multi-modal social cues, emotional states, moods, and other contextual information to the one or more processors 207. The context engine 222 can receive data from the various sensors. In one or more embodiments, the one or more processors 207 are configured to perform the operations of the context engine 222.

In one or more embodiments, the one or more processors 207 can be operable with the various authenticators of the identification system 217. For example, the one or more processors 207 can be operable with a first authenticator and a second authenticator. Where more authenticators are included in the identification system 217, the one or more processors 207 can be operable with these authenticators as well.

It is to be understood that in both FIG. 1 and FIG. 2, the elements illustrated are provided for illustrative purposes only in accordance with embodiments of the disclosure. Neither is intended to be a complete schematic diagram of the various components required. Therefore, other electronic devices in accordance with embodiments of the disclosure may include various other components obvious to those of ordinary skill in the art having the benefit of this disclosure, but not shown in FIG. 1 or FIG. 2, or may include a combination of two or more components or a division of a particular component into two or more separate components, and still be within the scope of the present disclosure.

Figure 3:
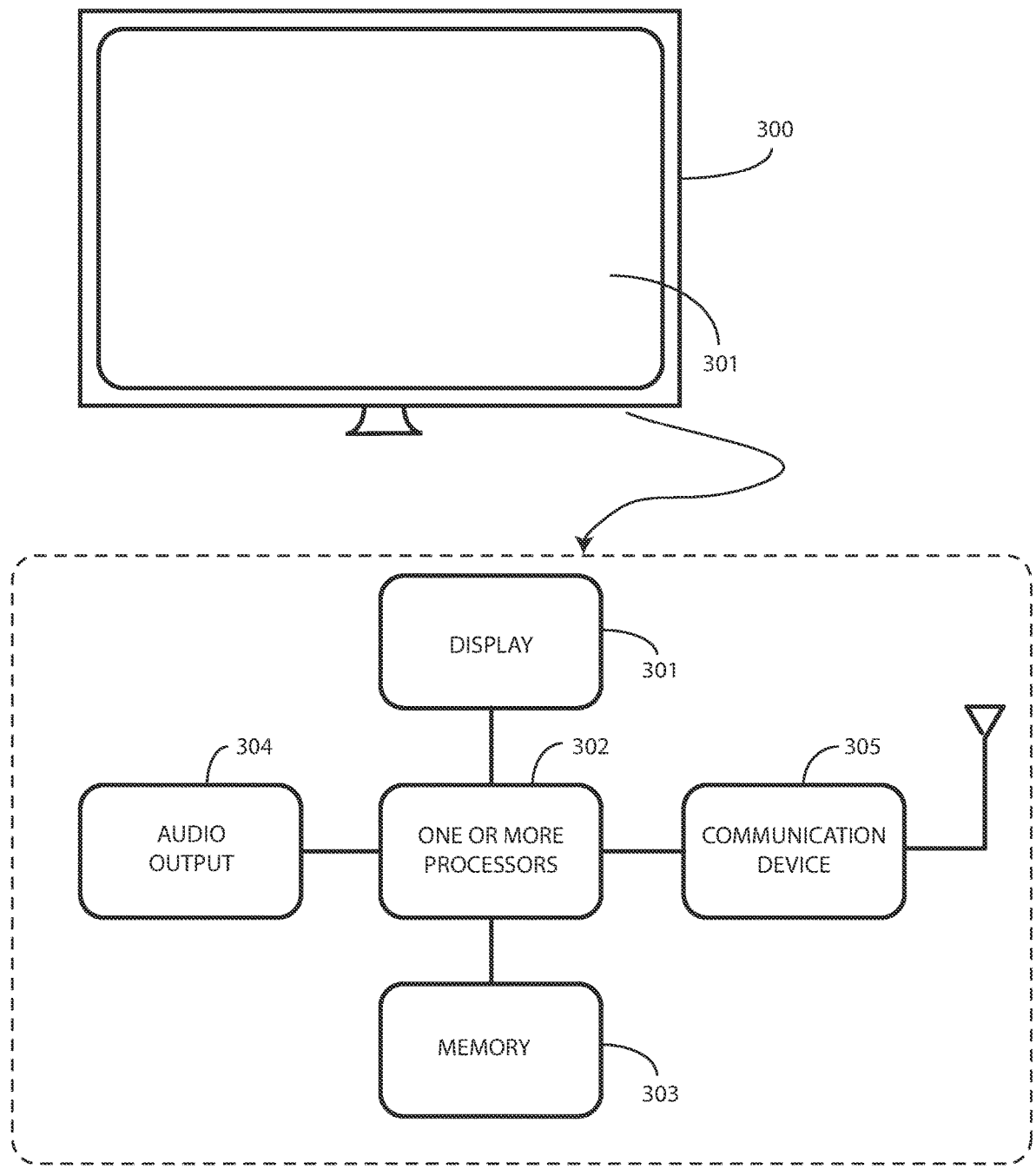
FIG. 3 illustrates one explanatory content presentation companion device in accordance with one or more embodiments of the disclosure.

Turning now to FIG. 3, illustrated therein is one explanatory content presentation companion device 300 in accordance with one or more embodiments of the disclosure. In this illustrative embodiment, the content presentation companion device 300 comprises a color video monitor. In other embodiments, the content presentation companion device 300 can take other forms. Illustrating by example, the content presentation companion device 300 can be a television, a computer display, a laptop display, a tablet computer, or a projector projecting content onto a screen. Other examples of content presentation companion devices 300 will be obvious to those of ordinary skill in the art having the benefit of this disclosure. Regardless of configuration, in one or more embodiments the content presentation companion device 300 includes one or more processors 302, a display 301, a memory 303, an audio output 304, and a communication device 305 capable of wired or wireless communication with an electronic device such as the electronic device (200) of FIG. 2.

In one or more embodiments, when coupled by either a wireless or wired connection to such an electronic device (200), the content presentation companion device 300 can function as a primary display for the electronic device (200). The electronic device (200) can receive content from a terrestrial broadcast network, cable television network, Internet streaming service, or combinations thereof, and redirect this content to the content presentation companion device 300 since its display 301 is larger than the display (201) of the electronic device (200). This allows people within the environment of the electronic device (200) or content presentation companion device 300 to more easily see the content. In one or more embodiments, content flows from the electronic device (200) to the content presentation companion device 300 through the communication device 305.

As will be described in more detail below with reference to the subsequent methods and method steps, the selection of login credentials, application profile login credentials, the automatic logging in to the electronic device using the login credential and/or the automatic logging into an application using the application profile login credential, the filtering of content suitable for presentation a content presentation companion device, and the transfer from one user account or application to another user account or application occurs as a function of one or more personal characteristics corresponding to one or more persons being physically situated within a predefined environment (213) of the electronic device (200) and/or the size of an augmented reality companion device (100). These personal characteristics can include characteristics such as whether a person is using an augmented reality companion device (100), the age of the person using the augmented reality companion device (100), the size of the augmented reality companion device (100) and whether that size is below a predefined size threshold, and so forth. Other examples of personal characteristics will be described below. Still others will be obvious to those of ordinary skill in the art having the benefit of this disclosure.

Figure 4:
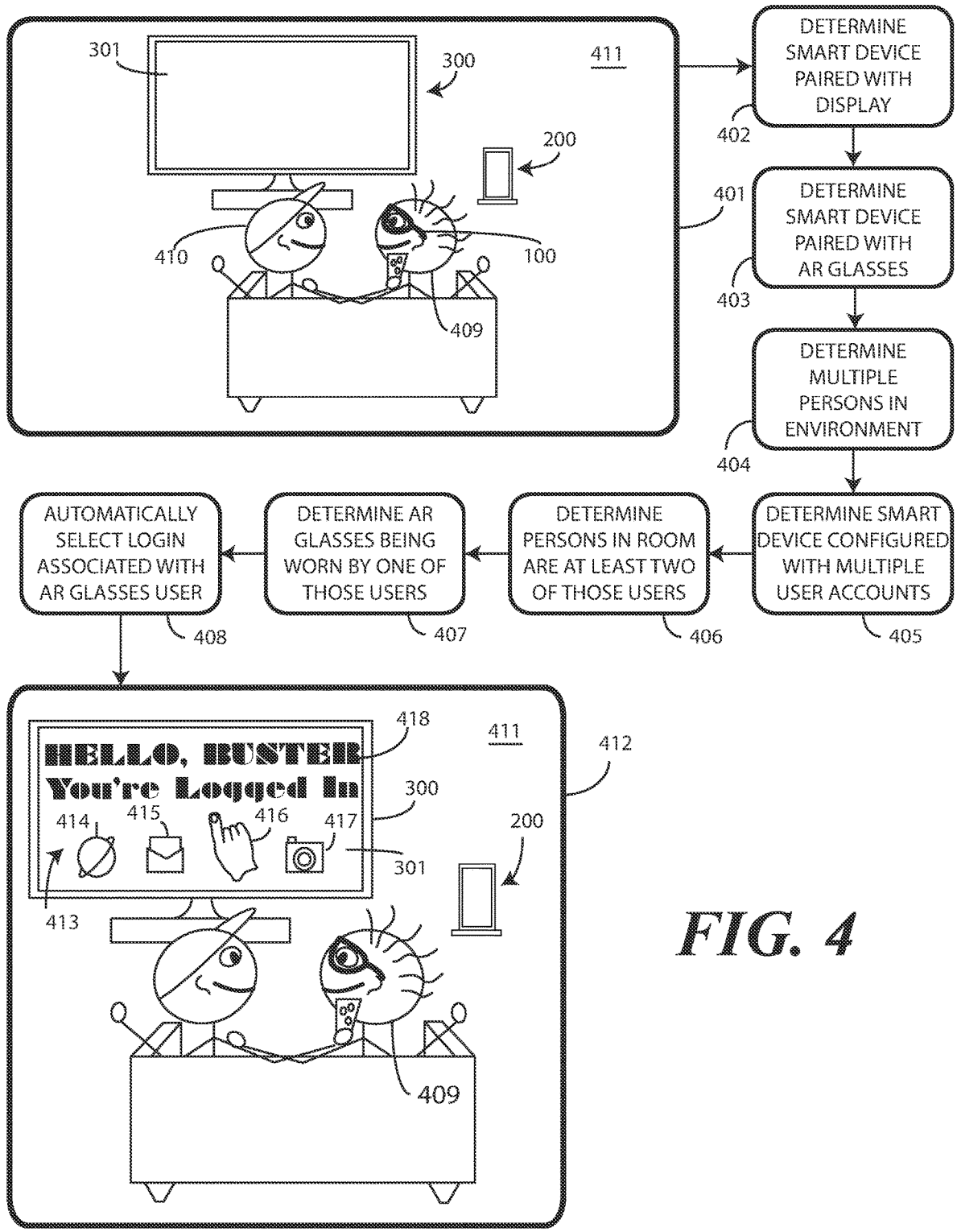
FIG. 4 illustrates one or more explanatory method steps in accordance with one or more embodiments of the disclosure.

Turning now to FIG. 4, illustrated therein one or more explanatory method steps illustrating how the augmented reality companion device 100 of FIG. 1, the electronic device 200 of FIG. 2, and the content presentation companion device 300 can be used as a system. Beginning at step 401, the electronic device 200 is electronically in communication with both the content presentation companion device 300 and the augmented reality companion device 100. When the electronic device 200 is electronically in communication with the content presentation companion device 300, this allows the electronic device 200 to use the larger display 301 of the content presentation companion device 300 to present content. Illustrating by example, in one or more embodiments the electronic device 200 can operate in a "desktop" mode by presenting a traditional computer user interface on the display 301 of the content presentation companion device 300. Alternatively, the electronic device 200 may present content such as videos, images, or other multimedia content on the display 301 of the content presentation companion device 300.

Embodiments of the disclosure contemplate that with the advanced computing power available in smartphones and other electronic devices, users often consume movies, videos, television shows, and other content using these devices. Additionally, they can perform work operations such as sending email, managing files, working on documents and spreadsheets, and so forth. By establishing an electronic communication channel between the electronic device 200 and the content presentation companion device 300, the processing power of the electronic device 200 can be leveraged to present content on the display 301 of the content presentation companion device 300. This allows a user to watch television, play video games, work on homework or office work, video call friends and family, or perform other tasks using the one or more processors (207) of the electronic device 200 combined with the large display 301 of the content presentation companion device 300.

As shown at step 401, while the electronic device 200 is in electronic communication with the content presentation companion device 300, the electronic device 200 is not yet presenting content on the display 301 of the content presentation companion device 300. However, a first person 409 and a second person 410 are situated within an environment 411 of the electronic device 200. In this illustrative embodiment, the electronic device 200 supports multiple users, each of whom can use the electronic device 200 by accessing a personal user account using personalized login credentials. Illustrating by example, when the first person 409 is using the electronic device 200, the first person 409 can login to the electronic device 200 by entering a login credential to access their applications, music library, video library, photo library, and files. When the second person 410 wants to use the electronic device 200, the user profile can change to that of the second person 410 when the second person 410 enters their login credential. This allows the first person 409 and the second person 410, by using their unique login credential, to each login to their user account to see their own user profile exclusively without the clutter or distraction of others user profiles, and so forth.

Additionally, in one or more embodiments applications operable on the electronic device 200 within user profiles associated with the first person 409 and the second person 410 can sometimes support multiple users who each have an application profile login credential. When, for example, launching a video streaming application within a user account, the application may have associated therewith a plurality of application profiles associated with a plurality of users. In this illustrative example, the first person 409 may have an application profile login credential for a video streaming application while the second person 410 also has an application profile login credential for the video streaming application. By entering an application profile login credential, either the first person 409 or the second person 410 can access a specific user profile associated with the application. Thus, the first person 409 may be able to maintain a wish list of wine videos within his user profile, while a second person 410, using the same application, may be able to record and save sporting dog competitions. Another user may be able to use the same application, but with a different application profile login credential, to access sporting events and educational programming.

With prior art systems, logging into the electronic device 200 would be a tedious and complicated procedure. A user would need to physically handle the electronic device 200, enter biometric information, a password, a personal identification number (PIN), or other criteria, and then authenticate themself to the electronic device 200. They may have to fully repeat the process when actuating an application within their user profile.

Embodiments of the disclosure advantageously streamline this process. In one or more embodiments, one or more processors (207) of the electronic device 200 first determine that the electronic device 200 is electronically in communication with the content presentation companion device 300. This determination can optionally include determining that the one or more processors (207) are using the display 301 of the content presentation companion device 300 as a primary display for the electronic device 200.

The one or more processors (207) additionally determine that the electronic device 200 is electronically in communication with an augmented reality companion device 100. Using one or more sensors (218), the one or more processors (207) can optionally determine that there are multiple persons within the environment 411 of the electronic device 200, which means that multiple persons can consume content presented on the display 301 of the content presentation companion device 300. This can, for example, be determined by processing one or more images captured by the imager (216) with the face analyzer (219), the environmental analyzer (220), the context engine (222) or other components of the electronic device 200. In one or more embodiments, this includes determining that at least one person of the multiple persons situated within the environment 411 of the electronic device 200 is an owner or authorized user of the electronic device 200.

Since the electronic device 200 supports multiple user accounts that can be accessed with corresponding login credentials, in one or more embodiments the one or more processors (207) determine whether a user operating the augmented reality companion device 100 has a login credential allowing access to the electronic device 200. Where they do, the one or more processors (207) of the electronic device automatically choose the login credential belonging to the user operating the augmented reality companion device 100 and automatically log that person into the electronic device 200. When a particular application is opened, and that application is configured with multiple accounts and logins, the one or more processors (207) automatically select the application profile login credential belonging to the person operating the augmented reality companion device 100 and log the person into the application using the application profile login credential.

In one or more embodiments, if the operation of the augmented reality companion device 100 transfers from one person to another person, depending on the context of home screen of the electronic device 200 or the application currently operating on the electronic device 200, the one or more processors (207) can provide an option to automatically switch to the profile from the person previously operating the augmented reality companion device 100 to the person operating the augmented reality companion device 100 after the transfer of operation has occurred.

In this illustration, both the first person 409 and the second person 410 have user accounts on the electronic device 200. Additionally, the first person 409 is also wearing an augmented reality companion device 100.

At step 402, one or more processors (207) of the electronic device 200 detect, using a communication device (209) of the electronic device 200, that the electronic device 200 is electronically in communication with the content presentation companion device 300 while the content presentation companion device 300 is operating as the primary display for the electronic device 200. At step 403, the one or more processors (207) of the electronic device 200 detect, again using the communication device (209) of the electronic device 200, that the electronic device is electronically in communication with the augmented reality companion device 100.

At step 404, the one or more processors (207) of the electronic device 200, operating in tandem with one or more sensors (218) of the electronic device 200, detect that multiple persons, here the first person 409 and the second person 410, are present within the environment 411 of the electronic device 200 while the content presentation companion device 300 is operating as the primary display for the electronic device 200.

At step 405, the one or more processors (207) of the electronic device 200 determine that the electronic device 200 supports multiple user accounts with each user creating a different login credential with which to login and/or authenticate themselves to the electronic device 200. Step 406 then comprises the one or more processors (207) of the electronic device 200 identifying, using an identification system (217) or other components of the electronic device 200, whether one person of the multiple persons situated within the environment 411 of the electronic device 200 is has associated therewith a login credential that can be used to login to the electronic device 200 to access a user account. Here, both the first person 409 and the second person 410 have user accounts on the electronic device 200. Accordingly, each of the first person 409 and the second person 410 constitutes an authorized user of the electronic device 200.

At step 407, the one or more processors (207) identify that the first person 409 is operating the augmented reality companion device 100. Said differently, in one or more embodiments step 407 comprises detecting, using the one or more sensors (218), the imager (216), the identification system (217), or other components of the electronic device 200, that the authorized user of the electronic device 200, here the first person 409, is operating the augmented reality companion device 100. As shown at step 401, in this illustrative example the authorized user is indeed operating the augmented reality companion device 100.

At step 408, the one or more processors (207) of the electronic device select a login credential for the electronic device 200 associated with the first person 409 due to the fact that the first person 409 is operating the augmented reality companion device 100. At step 408, the one or more processors (207) automatically log into an account profile of the electronic device 200 associated with the first person 409 using the selected login credential.

As shown at step 412, this automatic login action has logged the first person 409, Buster, into the electronic device 200. Accordingly, the display 301 of the content presentation companion device 300 becomes the primary display for the electronic device 200 by presenting content 413. In this illustration, the content 413 comprises a desktop mode with a welcome banner 418 and a plurality of user actuation targets 414, 415, 416, 417 associated with one or more applications. By toggling one of the user actuation targets 414, 415, 416, 417, the first person 409 can actuate an application. In the illustrative embodiment of FIG. 4, the automatic login occurring at step 408 occurs while multiple persons are within the environment of the electronic device 200 and despite the fact that both the first person 409 and the second person 410 are authorized users of the electronic device 200 with login credentials that can access a user profile on the electronic device 200. Here, the one or more processors (207) of the electronic device 200 automatically select the login credential associated with the first person 409 because the first person 409 is operating the augmented reality companion device 100.

Accordingly, as illustrated in FIG. 4, the electronic device 200 includes a communication device (209) electronically communicating with a content presentation companion device 300 operating as a primary display for the electronic device 200. The communication device (209) is also electronically communicating with an augmented reality companion device 100 being worn by an authorized user of the electronic device 200, which in this example is the first person 409.

One or more sensors (218), an identification system (217), an imager (216), or other components of the electronic device 200 detect multiple persons being situated within an environment 411 of the electronic device 200. In one or more embodiments, this detection occurs while the content presentation companion device 300 operates as the primary display of the electronic device 200. The one or more sensors (218), an identification system (217), an imager (216), or other components of the electronic device 200 then identify the person operating the augmented reality companion device 100, which in this example is the first person

409. The one or more processors (207) of the electronic device 200 select a login credential for the electronic device 200 associated with the first person 409 since the first person is operating the augmented reality companion device 100. The one or more processors (207) then automatically login to an account profile of the electronic device 200 associated with the first person using the login credential.

Figure 5:
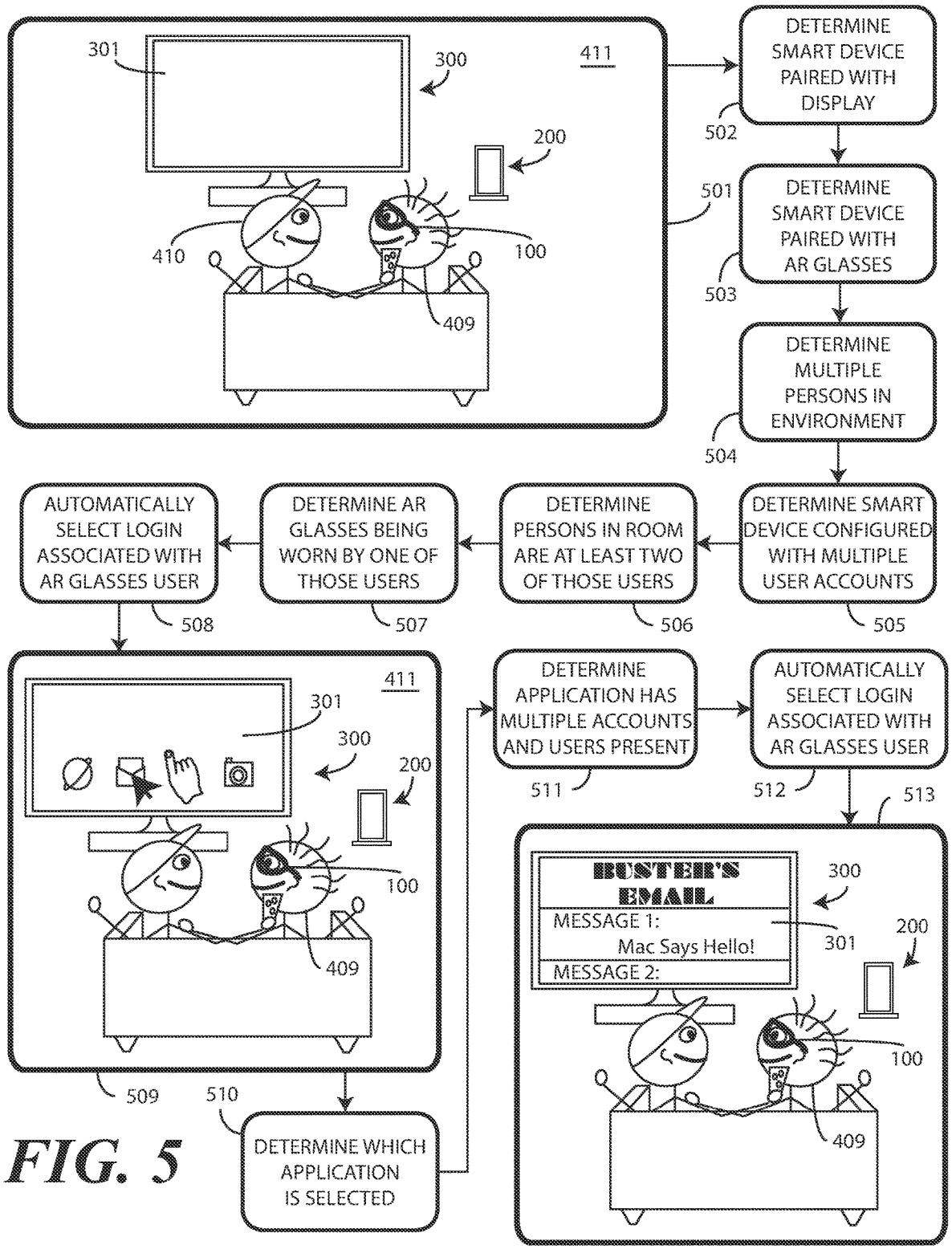
FIG. 5 illustrates one or more explanatory method steps in accordance with one or more embodiments of the disclosure.

This automatic login process can occur at the application level as well. Turning now to FIG. 5, illustrated therein are one or more method steps illustrating how this can occur. At step 501, an electronic device 200 includes a communication device (209) electronically communicating with a content presentation companion device 300 operating as a pressure relief device for the electronic device 200. One or more processors (207) of the electronic device 200 detect this at step 502. The communication device (209) is also electronically in communication with an augmented reality companion device 100. One or more processors (207) of the electronic device 200 detect this at step 503.

At step 504, one or more sensors (218) of the electronic device 200 detect multiple persons being situated within an environment 411 of the electronic device 200 while the content presentation companion device 300 operates as the primary display for the electronic device 200. Here, the multiple persons constitute a first person 409 and a second person 410. In this illustration, each of the first person 409 and the second person 410 has an account profile on the electronic device 200 that they can access with a separate and unique login credential. The one or more processors (207) of the electronic device 200 determine that the electronic device 200 supports multiple user accounts at step 505.

At steps 506, 507, 508, the one or more processors (207) of the electronic device 20 identify a person from the plurality of persons within the environment 411 who is operating the augmented reality companion device 100 and automatically authenticate the person operating the augmented reality companion device 100 to the electronic device 200. Illustrating by example, at step 506 the one or more processors (207), using the one or more sensors (218), an identification system (217), an imager (216), or other components of the electronic device 200, determine whether either or both of the persons situated within the environment 411 have account profiles on the electronic device 200. Here, both the first person 409 and the second person 410 have account profiles on the electronic device 200.

At step 507, the one or more processors (207), again using the one or more sensors (218), an identification system (217), an imager (216), or other components of the electronic device 200, identify that the first person 409 is operating the augmented reality companion device 100. At step 508, the one or more processors (207) select a login credential for the electronic device 200 associated with the first person 409 due to the fact that the first person 409 is operating the augmented reality companion device 100 and automatically log into the account profile of the electronic device 200 associated with the first person 409 as previously described.

Step 508 accordingly includes the one or more processors (207) of the electronic device 200 automatically logging the person operating the augmented reality companion device 100, here the first person 409, into the electronic device 200 upon identifying the person operating the augmented reality companion device 100 as being associated an authorized account profile selected from of a plurality of account profiles operable on the electronic device 200 at step 507. In one or more embodiments, this step 508 comprises automatically logging the person operating the augmented reality companion device 100 into the electronic device 200 by selecting a login credential for the electronic device 200 associated with the person operating the augmented reality companion device 100.

At step 509, the first person 409 actuates an email application. At step 509, the one or more processors (207) of the electronic device 200 detect this actuation of the email application, which is operating on the electronic device 200 but which has output content presented on the content presentation companion device 300. At step 510, the one or more processors (207) of the electronic device 200 determine the type of application that was actuated, which in this example is an email manager application.

At step 511, the one or more processors (207) of the electronic device 200 determine that the application has associated therewith a plurality of application profiles associated with a plurality of application users. In this example, both the first person 409 and the second person 410 have application profiles in the email application.

At step 512, the one or more processors (207) of the electronic device 200 select an application profile login credential associated with the person operating the augmented reality companion device 100, which in this example is the first person 409. At step 512, the one or more processors (207) of the electronic device 200 automatically log the first person 409 into their application profile of the application due to the fact that the first person 409 is operating the augmented reality companion device 100. Accordingly, in one or more embodiments step 512 comprises the one or more processors (207) of the electronic device 200 also automatically logging the person operating the augmented reality companion device 100, here the first person 409, into an application operating on the electronic device 200 in response to detecting actuation of the application at steps 509, 510. Said differently, in one or more embodiments step 512 comprises the one or more processors (207) additionally automatically authenticating the person operating the augmented reality companion device 100 to an application operating on the electronic device 200 in response to actuation of the application. As shown at step 513, the output content of the application can then be presented on the display 301 of the content presentation companion device 300.

Figure 6:
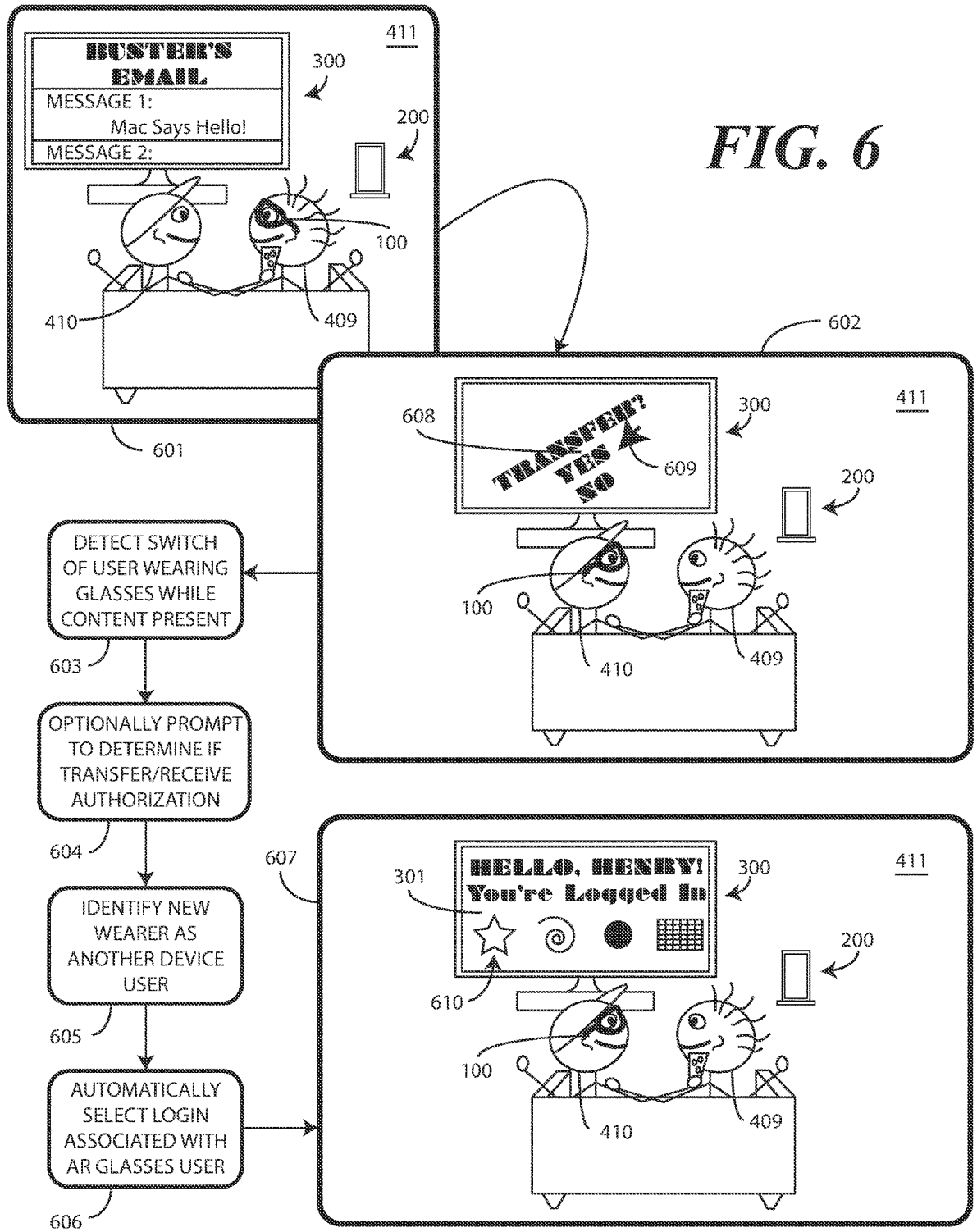
FIG. 6 illustrates one or more explanatory method steps in accordance with one or more embodiments of the disclosure.

Embodiments of the disclosure contemplate that the person operating the augmented reality companion device 100 may not stay constant. The first person 409 may elect to stop consuming content, may have better things to do, or may just want to share the augmented reality experience with the second person 410. For these and any number of other reasons, the first person 409 may elect to transfer operation of the augmented reality companion device 100 to another person, such as the second person 410. Embodiments of the disclosure quickly and conveniently are capable of switching one or both of user accounts at the electronic device 200 and or application profiles within an application when this occurs. Turning now to FIG. 6, illustrated therein are one or more method steps demonstrating how this can occur.

Step 601 begins where step (513) of FIG. 5 left off. Specifically, a system is shown where an electronic device 200 includes one or more sensors (218), a communication device (209), and one or more processors (207). A content presentation companion device 300 is electronically in communication with the electronic device 200. An augmented reality companion device 100 is also in communication with the electronic device 200.

A first person 409 and a second person 410 are situated within an environment 411 of the electronic device 200. Since both the first person 409 and the second person 410 have user accounts on the electronic device 200 and application profiles within one or more applications operating on the electronic device 200, the one or more processors (207) of the electronic device 200 have elected which person to login to the electronic device 200 and an application operating on the electronic device 200 based upon who is operating the augmented reality companion device 100. Here, the one or more processors (207) have identified the first person 409 as the person operating the electronic device 200. The one or more processors (207) have then automatically authenticated the first person 409 to the electronic device 200 by selecting a login credential for the electronic device 200 associated with the first person 409. The one or more processors (207) have also automatically logged the first person 409 into an application operating on the electronic device by selecting an application profile login credential and delivering it to the application in response to detecting actuation of the application. Accordingly, the first person 409, Buster, can read his email.

At step 602, the first person 409 transfers operation of the augmented reality companion device 100 to the second person 410. The one or more processors (207) of the electronic device 200 detect this transfer of operation at step 602. At step 403, the one or more processors (207), using the one or more sensors (218), an identification system (217), an imager (216), or other components of the electronic device 200, identify another person of the multiple persons situated within the environment 411 of the electronic device 200 operating the augmented reality companion device 100 after the transfer of operation. Here, step 603 comprises the one or more processors (207) identifying the second person 410 operating the augmented reality companion device 100.

At step 604, the one or more processors (207) optionally present a prompt 608, which is shown in step 602, requesting authorization to transition the electronic device 200 from the account profile associated with the person operating the augmented reality companion device 100 before the transfer of operation, which is the first person 409 in this example, to the other person operating the augmented reality companion device 100 after the transfer of operation, which is the second person 410 in this example. In other embodiments, the prompting will be omitted and an automatic transfer from an account profile of the first person 409 to another account profile of the second person 410 will occur. The presentation of the prompt 608 advantageously allows the second person 410 to elect whether to continue watching the previously presented content or to switch to content that may be more desirable. Since the content here is Buster's email, unless the second person 410 is just nosy or a snoop, it is likely that the second person 410 would rather watch their own content. Accordingly, as shown at step 602, the one or more processors (207) of the electronic device 200 receive, in response to the prompting of step 604, a response 609 in the form of an authorization to transition the electronic device 200 from the account profile associated with the first person 409 to another account profile associated with the second person 410.

At step 605, the one or more processors (207) of the electronic device 200, using the one or more sensors (218), an identification system (217), an imager (216), or other components of the electronic device 200, identify the second person 410 as a person who has an account profile on the electronic device 200. Accordingly, at step 606 the one or more processors (207) of the electronic device 200 select another login credential for the electronic device 200 associated with the second person 410 due to the fact that the second person 410 is now operating the augmented reality companion device 100. At step 606, the one or more processors (207) of the electronic device 200 automatically login to the account profile of the electronic device 200 associated with the second person 410 due to the fact that the second person 410 is operating the augmented reality companion device 100 after the transfer of operation from the first person 409 to the second person 410.

As shown at step 607, this automatic login action has logged the second person 410, Henry, into the electronic device 200. Accordingly, the display 301 of the content presentation companion device 300 becomes the primary display for the electronic device 200 by presenting content 610. In this illustration, the content 610 comprises another desktop mode with another welcome banner and a plurality of user actuation targets associated with one or more applications. By toggling one of the user actuation targets, the second person 410 can actuate an application. In the illustrative embodiment of FIG. 6, the automatic login occurring at step 606 occurs while multiple persons are within the environment 411 of the electronic device 200 and despite the fact that both the first person 409 and the second person 410 are authorized users of the electronic device 200 with login credentials that can access a user profile on the electronic device 200. Here, the one or more processors (207) of the electronic device 200 automatically select the login credential associated with the second person 410 because the first person 409 has transferred operation of the augmented reality companion device 100 to the second person 410, with the second person 410 operating the augmented reality companion device 100 after the transfer.

Figure 7:
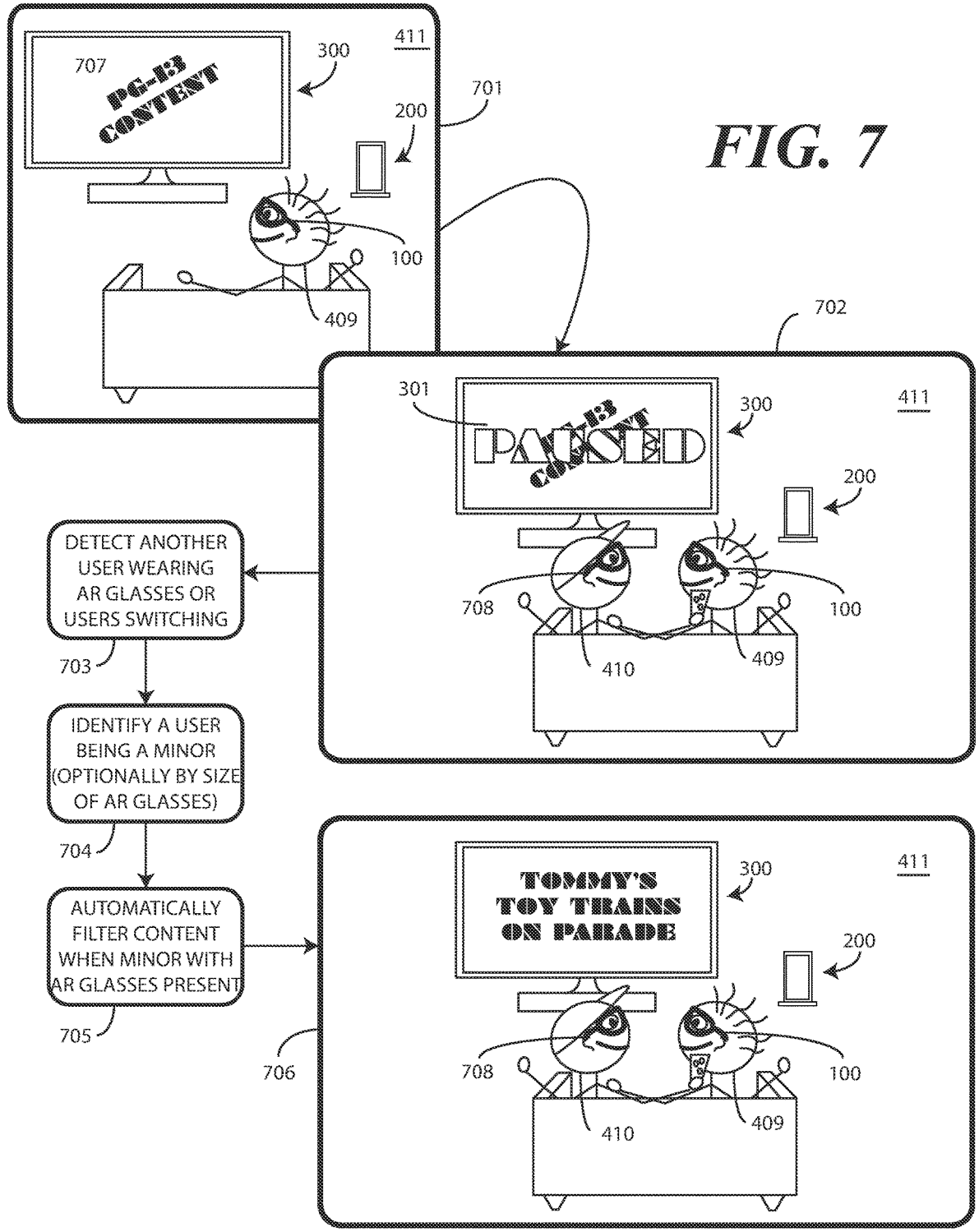
FIG. 7 illustrates one or more explanatory method steps in accordance with one or more embodiments of the disclosure.

In addition to automatically logging in a user to an account profile of the electronic device 200 using login credential selected as a function of a person operating an augmented reality companion device 100, and in addition to automatically logging in a user into an application profile of an application using an application profile login credential selected as a function of who is operating the augmented reality companion device 100, and further in addition to switching one or both of the account profile and/or application profile when operation of the augmented reality companion device 100 transfers from one person to another, embodiments of the disclosure can perform other operations as well. These other operations include supporting multiple users each operating their own augmented reality companion devices and performing filtering operations as well. Turning now to FIG. 7, illustrated therein are one or more method steps illustrating how these additional functions can occur.

Beginning at step 701, an electronic device 200 is electronically in communication with both a content presentation companion device 300 and an augmented reality companion device 100. A first person 409 is operating the augmented reality companion device 100. Despite their being only a single person within an environment 411 of the electronic device 200, in this illustrative embodiment one or more processors (207) of the electronic device automatically log in the first person 409 to the electronic device 200 due to the fact that the first person 409 is identified by the one or more processors (207) as operating the augmented reality companion device 100. As previously described, the one or more processors (207) can do this by selecting a login credential for the electronic device 200 associated with the first person 409 due to the fact that the first person 409 is operating the augmented reality companion device 100 and entering it into the electronic device 200. In this example, the one or more processors (207) of the electronic device 200 have also automatically logged the first person 409 into an application profile of an application associated with the first person (here a video application) by selecting an application profile login credential associated with the first person 409 and entering it into the application. As shown at step 701, this allows the first person 409 to consume content 707 in the form of a movie.

At step 702, a second person 410 has entered the environment 411 of the electronic device 200. The second person 410 also is operating an augmented reality companion device 708. The one or more processors (207), using the one or more sensors (218), an identification system (217), an imager (216), or other components of the electronic device 200, identify that the second person 410 is within the environment 411 of the electronic device 200, who the second person 410 is, and that the second person 410 is operating a second augmented reality companion device 708.

From this situation, several things can occur. First, the first person 409 and the second person 410 may have a mutually agreed priority structure that is defined in one or more user settings of the electronic device 200 defining which account profile and/or application profile should be used when both the first person 409 and the second person 410 are within the environment 411 of the electronic device 200 with each of the first person 409 and the second person 410 using their own augmented reality companion device 100, 708. If the first person 409 is the father, and the second person 410 the son, the father may have priority over the son when it comes to consuming content. Alternatively, if the first person 409 is an authorized user of the electronic device and the second person 410 is a guest not authorized to login to an account profile or application profile of an application, the first person 409 may have priority as well.

Second, the one or more processors 207 can present a prompt asking which account profile and/or application profile should be used. If, for example, the first person 409 is the husband and the second person 410 is a wife, the one or more processors (207) may present a prompt on the display 301 of the content presentation companion device 300 saying, "two users of this device (or application) have been detected. Which account profile (or application profile) should be selected? From there, the first person 409 and the second person 410 could mutually agree which account profile or application profile to use. Thereafter, the one or more processors (207) of the electronic device could automatically select a login credential to authenticate the identified person to the electronic device 200 and/or an application profile login credential to log the identified person into an application as previously described.

In the illustrative embodiment of FIG. 7, a filtering operation instead occurs. In one or more embodiments, using one or more sensors (218), an identification system (217), an imager (216), or other components of the electronic device 200, the one or more processors (207) can determine that at least one person operating an augmented reality companion device 100 is a minor. When this is the case, the one or more processors (207) can filter at lest some content available from the electronic device 200 to preclude the presentation of the at least some content available from the electronic device 200 on the content presentation companion device 300.

As shown at step 701, the content 707 being consumed is a movie of an adult nature. At step 703, the one or more processors (207) detect, using one or more sensors (218), an identification system (217), an imager (216), or other components of the electronic device 200, that a second person 410 has entered the environment 411 of the electronic device 200. The one or more processors (207) also detect that the second person 410 is operating another augmented reality companion device 708. (Instead of the second person 410 operating an independent augmented reality companion device 708 as shown in FIG. 2, the one or more processors (207) may alternatively detect a transfer of the augmented reality companion device 100 being operated by the first person 409 to the second person 410 as well.)

At step 704, the one or more processors (207) determine, again using one or more sensors (218), an identification system (217), an imager (216), or other components of the electronic device 200, that the second person 410 operating the second augmented reality companion device 708 is a minor. This step 704 can occur in a variety of ways.

Illustrating by example, an imager (216) of the electronic device 200 can capture an image of the second person 410. The identification system (217), the face analyzer (219), the environmental analyzer (220), the context engine (222) or other components of the electronic device 200 can identify at least one personal characteristic of the second person 410 to determine whether they are a minor. For example, facial recognition, voice recognition, depth scan recognition, or other techniques described above can be used to identify whether the second person 410 is a minor.

In the illustrative embodiment of FIG. 7, another technique is used. To wit, the one or more processors (207) of the electronic device 200 determine whether a person within the environment 411 of the electronic device 200 is a minor by determining whether a size of the augmented reality companion devices 100, 708 in communication with the electronic device 200 are below a predefined or predetermined augmented reality companion device size threshold. If, for example, augmented reality companion device 708 is a small augmented reality companion device configured to fit a smaller person, the one or more processors (207) can conclude that the second person 410 is a minor.

The size of the augmented reality companion device 708 can be determined in different ways as well. Image analysis can again be used. The one or more processors (207), optionally in conjunction with the identification system (217), the face analyzer (219), the environmental analyzer (220), the context engine (222) or other components of the electronic device 200, can perform image analysis to determine a size of the augmented reality companion device 708 relative to other elements in the environment 411. Alternatively, step 706 can comprise the communication device (209) of the electronic device 200 using electronic communication signals to interrogate the augmented reality companion device 708 to determine its size. Step 704 can then comprise the one or more processors (207) determining whether the size of the augmented reality companion device 708 is below a predetermined size threshold.

Where the second person 410 (or any person within the environment 411 of the electronic device 200) is determined to be a minor, in one or more embodiments step 705 comprises filtering at least some content available from the electronic device 200 to preclude presentation of the filtered content on the content presentation companion device 300. In the illustrative example of FIG. 7, the one or more processors (207) additionally pause (as shown at step 401) the content 707 previously being presented on the content presentation companion device 300. As shown at step 706, the one or more processors (207) can then switch to unfiltered content 709 that is suitable for a minor. Of course, should an adult (perhaps the first person 409 is the parent of the second person 410) elect to allow the minor to see the content 707 that was being originally presented, the first person 409 can override any filtering occurring at step 705 as well. Advantageously, this will expand the minor's access to content by bypassing the minor's permission restrictions and instead offering content selections commensurate with the parent's permissions.

Thus, as shown in FIG. 7, embodiments of the disclosure allow the electronic device 200 to pause the presentation of content 707 suited for mature audiences when the minor is within the environment 411 of the electronic device 200. Additionally, as shown at step 706, the electronic device 200 can further, in response to determining that the augmented reality companion device 708 is below a predefined augmented reality companion device size, change the content 707 to other content 709 that is "kid friendly." In this example, the electronic device 200 alters the content presentation by presenting content 709 other than that which is being filtered, i.e., content 707. Here, the content other than that which is being filtered is content 709, which is Tommy's Toy Train Parade. This content 708 is kid friendly and is therefore presented on the content presentation companion device 300. Thus, as shown and described in FIG. 7, the one or more processors (207) of the electronic device 200 can detect, optionally using the size of a detected augmented reality companion device, that a minor enters an environment 411 of the electronic device 200. Optional actions that can occur in response include pausing content 707 and/or switching the kid-friendly show of content 709.

Figure 8:
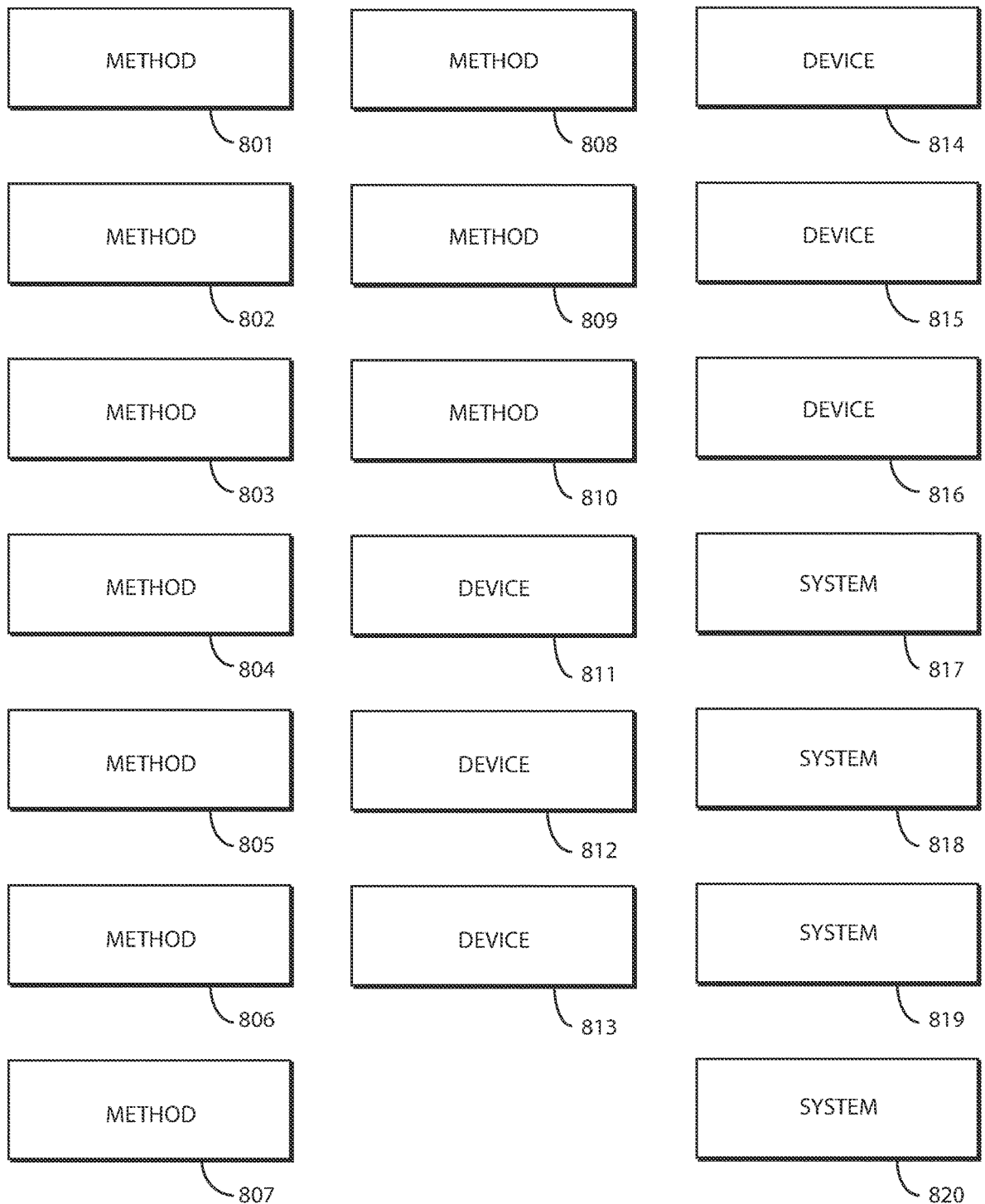
FIG. 8 illustrates various embodiments of the disclosure.

Turning now to FIG. 8, illustrated therein are various embodiments of the disclosure. The embodiments of FIG. 8 are shown as labeled boxes in FIG. 8 due to the fact that the individual components of these embodiments have been illustrated in detail in FIGS. 1-7, which precede FIG. 8. Accordingly, since these items have previously been illustrated and described, their repeated illustration is no longer essential for a proper understanding of these embodiments. Thus, the embodiments are shown as labeled boxes.

At 801, a method in an electronic device comprises detecting, with one or more processors, a communication device electronically in communication with both a content presentation companion device operating as a primary display for the electronic device and an augmented reality companion device. At 801, the method comprises detecting, with one or more sensors, multiple persons being present within an environment of the electronic device while the content presentation companion device is operating as the primary display for the electronic device.

At 801, the method comprises identifying, with the one or more processors, a person of the multiple persons operating the augmented reality companion device. At 801, the method comprises selecting, with the one or more processors, a login credential for the electronic device associated with the person operating the augmented reality companion device. At 801, the method comprises automatically logging into an account profile of the electronic device associated with the person operating the augmented reality companion device using the login credential.

At 802, the automatic logging into the account profile associated with the person operating the augmented reality companion device of 801 occurs while the multiple persons are present within the environment.

At 803, the method of 801 further comprises detecting, with the one or more sensors, a transfer of operation of the augmented reality companion device from the person to another person of the multiple persons. At 803, the method comprises identifying, with the one or more processors, the other person of the multiple persons operating the augmented reality companion device after the transfer of operation.

At 803, the method comprises selecting, with the one or more processors, another login credential for the electronic device associated with the other person operating the augmented reality companion device after the transfer of operation. At 803, the method comprises automatically logging into another account profile of the electronic device associated with the other person operating the augmented reality companion device using the other login credential in response to identifying the transfer of operation.

At 804, the method of 801 further comprises detecting, with the one or more processors, actuation of an application operating on the electronic device. At 804, the method comprises determining, with the one or more processors, that the application has associated therewith a plurality of application profiles associated with a plurality of application users.

At 804, the method comprises selecting, with the one or more processors, an application profile login credential associated with the person operating the augmented reality companion device. At 804, the method comprises automatically logging into the application profile of the application associated with the person operating the augmented reality companion device using the application profile login credential.

At 805, the method of 804 comprises detecting, with the one or more sensors, a transfer of operation of the augmented reality companion device from the person to another person of the multiple persons. At 805, the method comprises identifying, with the one or more processors, the other person of the multiple persons operating the augmented reality companion device after the transfer of operation.

At 805, the method comprises selecting, with the one or more processors, another application profile login credential for the application associated with the other person operating the augmented reality companion device after the transfer of operation. At 805, the method comprises automatically logging into another application profile of the application associated with the other person operating the augmented reality companion device using the other application profile login credential in response to identifying the transfer of operation.

At 806, the method of 801 further comprises detecting, with the one or more sensors, a transfer of operation of the augmented reality companion device from the person to another person of the multiple persons. At 806, the method comprises identifying, with the one or more processors, the other person of the multiple persons operating the augmented reality companion device after the transfer of operation. At 806, the method comprises presenting, with the one or more processors, a prompt requesting authorization to transition the electronic device from the account profile associated with the person operating the augmented reality companion device before the transfer of operation to the other person operating the augmented reality companion device after the transfer of operation.

At 807, the method of 806 comprises receiving, by the one or more processors in response to the prompting, the authorization to transition the electronic device from the account profile associated with the person operating the augmented reality companion device before the transfer of operation to the another person operating the augmented reality companion device after the transfer of operation. At 807, the method comprises selecting, with the one or more processors, another login credential for the electronic device associated with the other person operating the augmented reality companion device after the transfer of operation. At 807, the method comprises automatically logging into another account profile of the electronic device associated with the other person operating the augmented reality companion device using the other login credential in response to identifying the transfer of operation.

At 808, the method of 801 further comprises determining, by the one or more processors, that the person operating the augmented reality companion device is a minor. At 808, the method comprises filtering, by the one or more processors, at least some content available from the electronic device to preclude presentation of the at least some content available from the electronic device on the content presentation companion device.

At 809, the determination that the person operating the augmented reality companion device is a minor occurring at 808 comprises the one or more sensors determining a size of the augmented reality companion device is below a predetermined size threshold. At 810, the determination that the person operating the augmented reality companion device is a minor occurring at 808 comprises the communication device interrogating the augmented reality companion device to determine a size of the augmented reality companion device is below a predetermined size threshold.

At 811, an electronic device comprises a communication device electronically communicating with a content presentation companion device operating as a primary display for the electronic device and an augmented reality companion device. At 811, the electronic device comprises one or more sensors detecting multiple persons within an environment of the electronic device while the content presentation companion device operates as the primary display for the electronic device.

At 811, the electronic device comprises one or more processors automatically logging a person operating the augmented reality companion device into the electronic device upon identifying the person operating the augmented reality companion device as being associated an authorized account profile selected from of a plurality of account profiles operable on the electronic device. At 812, the one or more processors of 811 automatically login the person operating the augmented reality companion device into the electronic device by selecting a login credential for the electronic device associated with the person operating the augmented reality companion device.

At 813, the one or more processors of 811 prompting for permission to transition from the authorized account profile to another authorized account profile in response to the one or more sensors detecting a transfer of operation of the augmented reality companion device from the person to another person of the multiple persons. At 814, the one or more processors of 811 transition from the authorized account profile to another authorized account profile in response to the one or more sensors detecting a transfer of operation of the augmented reality companion device from the person to another person of the multiple persons.

At 815, the one or more processors of 811 filter at least some content available from the electronic device by precluding presentation of at least some content on the content presentation companion device when the one or more processors determine a size of the augmented reality companion device to be less than a predefined augmented reality companion device size threshold. At 816, the one or more processors of 811 also automatically logging the person operating the augmented reality companion device into an application operating on the electronic device in response to detecting actuation of the application.

At 817, a system comprises an electronic device comprising one or more sensors, a communication device, and one or more processors. At 817, the system comprises a content presentation companion device electronically in communication with the electronic device. At 817, the system comprises an augmented reality companion device in communication with the electronic device. At 817, the one or more processors identify a person from a plurality of persons who is operating the augmented reality companion device and automatically authenticate the person operating the augmented reality companion device to the electronic device.

At 818, the one or more processors of 817 additionally automatically authenticate the person operating the augmented reality companion device to an application operating on the electronic device in response to actuation of the application. At 819, the one or more processors determine a size of the augmented reality companion device and filtering content from presentation on the content presentation companion device when the size of the augmented reality companion device is below a predefined size threshold. At 820, the one or more processors of 817 authenticate another person from the plurality of persons to the electronic device when the person who is operating the augmented reality companion device transfers operation of the augmented reality companion device to the other person.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with one or more processors, a communication device electronically in communication with both:
        a content presentation companion device operating as a primary display for the electronic device; and
        an augmented reality companion device;
    detecting, with one or more sensors, multiple persons being present within an environment of the electronic device while the content presentation companion device is operating as the primary display for the electronic device;
    identifying, with the one or more processors, a person of the multiple persons operating the augmented reality companion device;
    selecting, with the one or more processors, a login credential for the electronic device associated with the person operating the augmented reality companion device; and
    automatically logging into an account profile of the electronic device associated with the person operating the augmented reality companion device using the login credential;
    further comprising:
        detecting, with the one or more processors, actuation of an application operating on the electronic device by the person operating the augmented reality companion device while output content from the electronic device is presented on the content presentation companion device;
        selecting, with the one or more processors, an application profile login credential associated with the person operating the augmented reality companion device; and
        automatically logging into an application profile of the application associated with the person operating the augmented reality companion device using the application profile login credential; and
        thereafter presenting other output content associated only with the application profile of the application on the content presentation companion device.

2. The method of claim 1, wherein the automatically logging into the account profile associated with the person operating the augmented reality companion device occurs while the multiple persons are present within the environment.

3. The method of claim 1, further comprising:
    detecting, with the one or more sensors, a transfer of operation of the augmented reality companion device from the person to another person of the multiple persons;
    identifying, with the one or more processors, the another person of the multiple persons operating the augmented reality companion device after the transfer of operation;
    selecting, with the one or more processors, another login credential for the electronic device associated with the another person operating the augmented reality companion device after the transfer of operation; and
    automatically logging into another account profile of the electronic device associated with the another person operating the augmented reality companion device using the another login credential in response to identifying the transfer of operation.

4. The method of claim 1, further comprising:
    determining, with the one or more processors, that the application has associated therewith a plurality of application profiles associated with a plurality of application users.

5. The method of claim 1, further comprising:
    detecting, with the one or more sensors, a transfer of operation of the augmented reality companion device from the person to another person of the multiple persons;
    identifying, with the one or more processors, the another person of the multiple persons operating the augmented reality companion device after the transfer of operation;
    selecting, with the one or more processors, another application profile login credential for the application associated with the another person operating the augmented reality companion device after the transfer of operation; and automatically logging into another application profile of the application associated with the another person operating the augmented reality companion device using the another application profile login credential in response to identifying the transfer of operation.

6. The method of claim 1, further comprising:
detecting, with the one or more sensors, a transfer of operation of the augmented reality companion device from the person to another person of the multiple persons;
identifying, with the one or more processors, the another person of the multiple persons operating the augmented reality companion device after the transfer of operation; and
presenting, with the one or more processors, a prompt requesting authorization to transition the electronic device from the account profile associated with the person operating the augmented reality companion device before the transfer of operation to the another person operating the augmented reality companion device after the transfer of operation.

7. The method of claim 6, further comprising:
receiving, by the one or more processors in response to the prompting, the authorization to transition the electronic device from the account profile associated with the person operating the augmented reality companion device before the transfer of operation to the another person operating the augmented reality companion device after the transfer of operation;
selecting, with the one or more processors, another login credential for the electronic device associated with the another person operating the augmented reality companion device after the transfer of operation; and
automatically logging into another account profile of the electronic device associated with the another person operating the augmented reality companion device using the another login credential in response to identifying the transfer of operation.

8. The method of claim 1, further comprising:
determining, by the one or more processors, that the person operating the augmented reality companion device is a minor; and
filtering, by the one or more processors, at least some content available from the electronic device to preclude presentation of the at least some content available from the electronic device on the content presentation companion device.

9. The method of claim 8, wherein the determining that the person operating the augmented reality companion device is a minor comprises the one or more sensors determining a size of the augmented reality companion device is below a predetermined size threshold.

10. The method of claim 8, wherein the determining that the person operating the augmented reality companion device is a minor comprises the communication device interrogating the augmented reality companion device to determine a size of the augmented reality companion device is below a predetermined size threshold.

11. An electronic device, comprising:
a communication device electronically communicating with a content presentation companion device operating as a primary display for the electronic device and an augmented reality companion device;
one or more sensors detecting multiple persons within an environment of the electronic device while the content presentation companion device operates as the primary display for the electronic device; and
one or more processors automatically logging a person operating the augmented reality companion device into the electronic device upon identifying the person operating the augmented reality companion device as being associated an authorized account profile selected from of a plurality of account profiles operable on the electronic device;
the one or more processors also automatically logging the person operating the augmented reality companion device into an application profile of an application operating on the electronic device in response to detecting actuation of the application by selecting an application profile login credential associated with the person operating the augmented reality companion device and thereafter presenting output content associated only with the application profile of the application on the content presentation companion device.

12. The electronic device of claim 11, the one or more processors automatically logging the person operating the augmented reality companion device into the electronic device by selecting a login credential for the electronic device associated with the person operating the augmented reality companion device.

13. The electronic device of claim 11, the one or more processors prompting for permission to transition from the authorized account profile to another authorized account profile in response to the one or more sensors detecting a transfer of operation of the augmented reality companion device from the person to another person of the multiple persons.

14. The electronic device of claim 11, the one or more processors to transitioning from the authorized account profile to another authorized account profile in response to the one or more sensors detecting a transfer of operation of the augmented reality companion device from the person to another person of the multiple persons.

15. The electronic device of claim 11, the one or more processors filtering at least some content available from the electronic device by precluding presentation of at least some content on the content presentation companion device when the one or more processors determine a size of the augmented reality companion device to be less than a predefined augmented reality companion device size threshold.

16. The electronic device of claim 11, wherein the application has associated therewith a plurality of application profiles.

17. A system, comprising:
an electronic device comprising one or more sensors, a communication device, and one or more processors;
a content presentation companion device electronically in communication with the electronic device; and
an augmented reality companion device in communication with the electronic device;
the one or more processors identifying a person from a plurality of persons who is operating the augmented reality companion device and automatically authenticating the person operating the augmented reality companion device to the electronic device;
the one or more processors additionally automatically authenticating the person operating the augmented reality companion device to an application profile of an application operating on the electronic device by selecting an application profile login credential in response to actuation of the application and thereafter presenting output content of the application associated only with the application profile on the content presentation companion device.

18. The system of claim 17, the application operating on the electronic device comprising an email application.

19. The system of claim 17, the one or more processors determining a size of the augmented reality companion device and filtering content from presentation on the content presentation companion device when the size of the augmented reality companion device is below a predefined size threshold.

20. The system of claim 17, the one or more processors authenticating another person from the plurality of persons to the electronic device when the person who is operating the augmented reality companion device transfers operation of the augmented reality companion device to the another person.

* * * * *